United States Patent
Craig et al.

(10) Patent No.: US 8,031,673 B2
(45) Date of Patent: Oct. 4, 2011

(54) CELL CHANGE IN CELLULAR NETWORKS

(75) Inventors: Stephen Craig, Nacka (SE); Stefan Eriksson, Bromma (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 929 days.

(21) Appl. No.: 11/921,179

(22) PCT Filed: Apr. 18, 2006

(86) PCT No.: PCT/SE2006/000460
§ 371 (c)(1),
(2), (4) Date: Nov. 28, 2007

(87) PCT Pub. No.: WO2006/130063
PCT Pub. Date: Dec. 7, 2006

(65) Prior Publication Data
US 2009/0042572 A1    Feb. 12, 2009

Related U.S. Application Data

(60) Provisional application No. 60/686,930, filed on Jun. 3, 2005.

(51) Int. Cl.
*H04W 4/00* (2009.01)
(52) U.S. Cl. .......................... 370/331; 455/436
(58) Field of Classification Search .................. 370/329, 370/331, 254, 328, 333, 455, 436, 450, 453, 370/509; 455/439, 442, 509, 453, 452.1, 455/452.2
See application file for complete search history.

(56) References Cited

U.S. PATENT DOCUMENTS

| 2002/0045451 | A1* | 4/2002 | Hwang et al. ............. 455/442 |
| 2002/0107022 | A1 | 8/2002 | Muniere |
| 2003/0189909 | A1 | 10/2003 | Chao et al. |
| 2004/0039910 | A1 | 2/2004 | Isokangas et al. |
| 2007/0032255 | A1* | 2/2007 | Koo et al. ................. 455/512 |

FOREIGN PATENT DOCUMENTS

| EP | 1059820 | 12/2000 |
| EP | 1432262 | 6/2004 |
| WO | 2005-055437 | 6/2005 |
| WO | WO 2006/098665 | 9/2006 |

OTHER PUBLICATIONS

Notification Concerning Transmittal of International Preliminary Report on Patentability for PCT/SE2006/000460 dated Dec. 31, 2007.
Written Opinion of the International Searching Authority for PCT/SE2006/000460 dated Sep. 25, 2006.

* cited by examiner

*Primary Examiner* — Seema S. Rao
*Assistant Examiner* — Henry Baron
(74) *Attorney, Agent, or Firm* — Nixon & Vanderhye P.C.

(57) ABSTRACT

A handover or cell change procedure in a cellular radio communications system starts with mobile user terminal present in a serving cell and having multiple radio resources simultaneously allocated for communication with a base station of the cell. When there is a need for a cell change, the multiple radio resources are sequentially replaced with radio resources allocated to the terminal for communication with at least one base station having an associated cell different from the serving cell. This cell change procedure provides macro diversity without requiring the complexity of soft handover and has enhanced service coverage and handover robustness compared to hard handover.

31 Claims, 14 Drawing Sheets

CELL CHANGE IN CELLULAR NETWORKS

This application is the U.S. national phase of International Application No. PCT/SE2006/000460 filed 18 Apr. 2006 which designated the U.S. and claims priority to U.S. Provisional Application No 60/686,930 filed 3 Jun. 2005, the entire contents of each of which are hereby incorporated by reference.

TECHNICAL FIELD

The technology described in this application generally relates to cell changes for mobile user terminals in cellular networks, and in particular, to performing such cell changes for mobile user terminals having multiple simultaneously allocated radio transmission resources.

BACKGROUND

Functionality to handle user terminal mobility is a fundamental component in cellular networks. From a service quality perspective, such functionality must ensure that service continuity is maintained as users move from one cell to another during an active session, and that each new session is established in a sufficiently good radio environment. From a spectral efficiency perspective, such functionality should ensure that an active user is always served by the most appropriate base station or base stations, which typically means the closest base station(s) in a radio sense. The process of modifying the number or identity of base stations serving a given user during an active session is commonly referred to as (serving) cell change or "handover".

The provision of diversity against fading is a key method for improving the performance and efficiency of cellular networks. While there are numerous micro diversity techniques aimed at mitigating the effects of Rayleigh fading, (examples include receiver diversity, transmit diversity, interleaving and frequency hopping), macro diversity to combat the impact of shadow fading has fewer options. In order to obtain a macro diversity gain the possibility for simultaneous transmission and/or reception of related information in different base stations must be involved in some way. Macro diversity is particularly beneficial near the cell border, where it can dramatically improve service coverage, especially when the shadow fading from different base stations is uncorrelated.

A multi-carrier system utilizes multiple radio transmission resources to transmit data to and/or receive data from a given user terminal. Multi-carrier often means that multiple carrier frequencies are used, but more generally it can include all systems where a plurality of radio transmission resources can be simultaneously allocated to a given user terminal. Examples of radio transmission resources well-known in the art are frequencies, time slots, Orthogonal Frequency Division Multiplexing (OFDM) chunks, channelization codes, etc.

In existing cellular systems, including multi-carrier systems, the handover process is typically classed as "hard" or "soft". The hard handover procedure is schematically illustrated in FIGS. 1A to 1C for a multi-carrier system. In FIG. 1A, a mobile user terminal 10 present in a cell 25 of a serving base station 20 has two radio transmission resources 22, 24 simultaneously allocated for conducting uplink or downlink communication with the base station 20. The mobile user terminal 10 then starts to move away from the serving base station 20 and into a cell 35 of another base station 30. FIG. 1B illustrates the situation where the mobile terminal 10 is present within the coverage areas of both cells 25, 35. At this position, the resources 22, 24 allocated by the old base station 20 are still utilized for communication. If the movement continues, as in FIG. 1C, the single serving base station 20 passes on the connections in their entirety to another serving base station 30. The mobile user terminal 10 will then have two radio transmission resources 32, 34 allocated for communication with the new base station 30.

Soft handover in a multi-carrier system is schematically illustrated in FIGS. 2A-2C. In FIG. 2A, a mobile user terminal 10 has been simultaneously allocated two radio transmission resources 22, 24 for conducting uplink or downlink communication with a base station 20. This mobile user terminal starts to move away from the cell 25 served by the current active base station and into a new cell 35 of a new base station 30, see FIG. 2B. At this instance, two radio transmission resources 32, 34 are also simultaneously allocated to the user terminal 10 for communication with the new base station 30. This means that a so-called active set of multiple base stations 20, 30 maintains simultaneous connections 22, 24, 32, 34 with the mobile user terminal 10. Duplicate information is always simultaneously transmitted and/or received in the multiple base stations 20, 30 using the respective allocated resources 22, 24 and 32, 34. This means that the same raw (bit) data is transmitted on the allocated resources 22, 24 and 32, 34 in the two different cells 25, 35, though different physical layer processing, e.g. scrambling, of the raw data can be used in the two cells 25, 35. As the mobile user terminal 10 continues its movement into the new cell 35, see FIG. 2C, the old base station 20 is removed from the active set and the allocation of its resources 22, 24 is withdrawn. The user terminal 10 will then only have two simultaneously allocated radio transmission resources 32, 34 for conducting data communication.

Another less common handover method that can be regarded as a hybrid between soft and hard handover is "fast switching". It is similar to soft handover in that a potentially active set of multiple base stations is maintained, but only one base station in the potentially active set actually transmits or receives at any point in time, the choice of active base station being based on the instantaneous radio conditions.

Soft handover and fast switching solutions typically give better service coverage and a more robust handover process than hard handover because they inherently include a macro diversity gain since related, in this case duplicate, information is simultaneously transmitted and/or received in the multiple base stations. However, they involve higher complexity and cost in infrastructure and user terminals, and they demand more transmission and air interface resources (the number of resources allocated to the terminal is doubled during the handover). Their introduction is in many cases simply unfeasible.

Hard handover is easier and cheaper to implement and it utilizes fewer resources than soft handover and fast switching, but achieving the requisite robustness and service coverage can be difficult due to the lack of macro diversity.

An example of the service coverage difficulties experienced with hard handover can arise when a cell change is performed during a file download or similar data transfer. Data already in the buffer for the source cell may either need to be emptied before the handover can be performed, which delays the handover procedure, or discarded and then retransmitted in the target cell. Either way, service quality and system performance are adversely affected.

SUMMARY

There is therefore a need for a cell change and handover solution that can be used in cellular systems, in which soft handover and fast switching are unfeasible or unwanted, and that maintains both handover robustness and service coverage.

The technology described in this application overcomes these and other drawbacks of the prior art arrangements.

It is a general object to provide a cell change procedure enabling provision of macro diversity.

It is another object to provide a cell change procedure having a low cost and complexity in terms of receiver and transmitter equipment.

Yet another object is to provide a cell change or handover procedure suitable for use in multi-carrier communications systems.

Briefly, the involves a cell change or handover procedure that can be used in a multi-carrier system where a mobile user terminal has multiple radio transmission resources simultaneously allocated for communication with a serving base station having a serving cell, in which the user terminal currently is present. The cell change is conducted by sequentially, i.e. step by step, replacing, when the user terminal moves away from the current cell and into a new serving cell, the multiple simultaneously allocated radio resources with radio transmission resources allocated to the user terminal for communication with a base station serving the new serving cell. As a consequence, not all the resources allocated to the user terminal are replaced or handed over simultaneously. Instead, this resource replacement is performed in at least two steps with a first set of the radio transmission resources being replaced in the first step and the remaining resources being replaced in one or more subsequent (time-separated) steps.

As the mobile user terminal moves throughout the system, the terminal and/or base stations and network nodes within communication range to the terminal preferably perform radio quality related measurements and estimations. These measurements and estimations are utilized for detecting a need for a cell change, i.e. for detecting when to initiate the cell change procedure. The decision to trigger the cell change, which is at least partly based on the quality measurements, can be made by the user terminal, the current serving base station(s), a neighbor base station that is a candidate as new serving base station or a control network node in the system. A control message is typically generated upon detection of this cell change need and distributed to the relevant base stations and preferably the user terminal. The control message commands the involved parties to trigger and perform the sequential replacement of radio transmission resources.

In a typical example, a mobile user terminal is present in a first cell and being served by a first base station. The user terminal further has N radio transmission resources allocated for communicating with the base station. The resources can be N uplink resources for transmitting data to the base station or N downlink resources for receiving data from the base station, where $N \geq 2$. It is anticipated that the terminal can be allocated $N_1$ downlink resources and $N_2$ uplink resources, where at least one of $N_1$, $N_2$ is equal to or larger than two. As the mobile user terminal moves away from the first base station and enters into a second cell having a second serving base station, the cell change procedure can be triggered. The N ($N_1$ and $N_2$) resources are then sequentially replaced with resources allocated to the user terminal for communication in the new second cell with the second base station.

The cell change procedure can also be applied to a so-called intra-site handover. This means that the user terminal is served by and communicates with the same base station after completion of the cell change as before initiating the change procedure. However, the user terminal is present in different cells or sectors of the base station before and after the cell change.

More than two base stations and cells can be involved in the cell change procedure, implying that, at the initiation of the cell change, the user terminal is connected to and communicates with multiple base stations, during and/or after the cell change the user terminal has radio resources allocated in different cells. This means that the technology is very flexible in terms of the particular network layout and communication situation that can benefit from it. The basic requirements are however that the user terminal has multiple radio transmission resources simultaneously allocated for communication with at least one base station and that these resources are sequentially replaced with resources allocated to the terminal for communication with at least one base station.

In another non-limiting, example embodiment, the mobile user terminal has multiple radio transmission resources simultaneously allocated for communication in at least two different cells, and with two different base stations or a same base station. Furthermore, data transmitted by the mobile user terminal or received by the terminal in the two different cells is based on different raw data. These multiple originally allocated resources are then sequentially replaced with resources used by the mobile user terminal for communication with one or more base stations.

The technology described in this application also provides flexibility in the usage of the radio transmission resources during the cell change procedure. In a first possible implementation, the resources in the different cells and allocated to the same user terminal can be used for (uplink/downlink) transmission of data that is related on the physical layer. For example, the same user data can be transmitted on the resources with different channel coding. Alternatively, user data can be transmitted using the radio transmission resources allocated in the first cell, whereas the resources allocated to the terminal in the second cell are employed for transmission of extra redundancy, e.g. in the form of additional parity bits. In an alternative scenario, the radio transmission resources are used for transmission of data in the first and second cells that is related on higher layers but independent on the physical layer. For example, the user terminal could request the downloading of a web page using the resources. In such a case, objects belonging to this same web page can be provided on the different radio transmission resources. This means that there is a macro diversity gain on higher layers but no direct gain in link performance. The user plane and control plane could be treated differently in this respect. For instance, the user plane resources in the first and second cells could be used to transmit data that is independent on the physical layer to maintain the user data throughput throughout the handover, while the control plane resources in the first and second cells could be used to transmit information directly related to the same control plane signaling, in order to maximize the robustness of the signaling link.

As the technology described in this application involves replacement of radio transmission resources in multiple steps and can potentially involve multiple different base stations, there is a further degree of flexibility in how to perform the actual resource replacement. The resource replacement can therefore be made dependent on different replacement criteria that are utilized to obtain a cell change procedure that is as optimal as possible. These criteria can be utilized for determining, for example, which resource(s) is (are) to be replaced in each step, when such a replacement is to take place, how many steps the cell change should involve and which new resource(s) is (are) to be allocated to the user terminal.

An example of such a replacement criterion is an actual value of a cell change related timer. It could, e.g. be possible that each step of the resource replacement is to be performed following a pre-defined period of time following the detection of the need for cell change. Alternatively, a minimum/maximum time period could be utilized between two replacement steps in the cell change procedure. In another example, a quality parameter representative of a radio quality for the communications link between the mobile user terminal and the original base station could be used. For example, it can be more advantageous to replace more resources in the first replacement step in conditions where the radio link quality deteriorates rapidly as compared to a situation where the link quality deteriorates more slowly. Correspondingly, a radio quality metric representative of a radio quality in at least one destination cell into which the mobile user terminal is moving can be useful as a replacement criterion. If the quality, e.g. received signal strength, increases very slowly, it can be advantageous to extend the cell change procedure over time, e.g. by using more than two replacement steps (where applicable) and/or increasing the period of time between the execution of two replacement steps. The buffer level in a transmit buffer arranged in the current serving base station and comprising data destined to the user terminal can also be used as a replacement criterion. If the base station has a lot of data to send to the user terminal shortly before the initiation of the cell change, it will typically be advantageous to keep as many downlink transmission resources as possible allocated from this base station until the base station has emptied the buffer of this data. This means that in the first step or few steps, single downlink resources could be replaced instead of replacing multiple resources in the first (few) step(s). In a similar manner the buffer level in the user terminal, a candidate serving base station and/or a control network node can be of relevance for the cell change operation.

The technology described in this application offers the following example advantages:

Provides macro diversity without introducing the costs and complexity in infrastructure and terminals of soft handover and fast switching and demands less transmission and air interface resources than soft handover and fast switching;

Provides enhanced service coverage and handover robustness compared to hard handover;

Can be readily combined with other techniques for improving handover performance, e.g. cell muting;

Offers flexibility in conducting the sequential radio resource replacement;

Allows for a faster and less disruptive handover process when the old serving base station has buffered data destined to the user terminal at the initiation of the cell change; and Maximizes system capacity and performance.

Other advantages will be appreciated upon reading of the description of the non-limiting, example embodiments of the invention below.

SHORT DESCRIPTION OF THE DRAWINGS

DETAILED DESCRIPTION

Figure 1A:
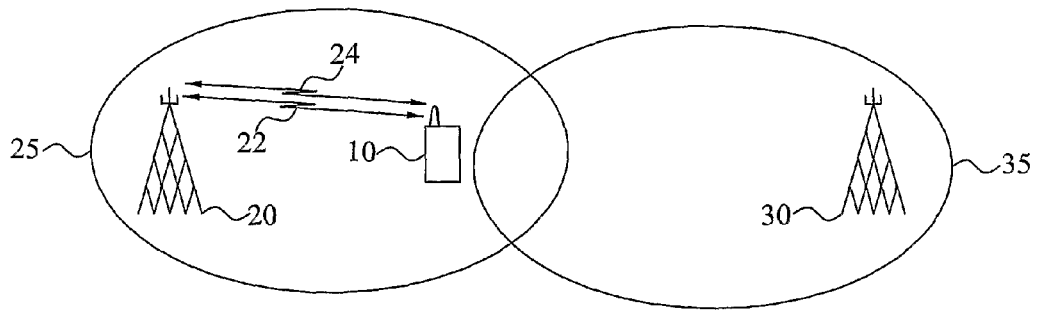
FIGS. 1A-1C are diagrams illustrating a hard handover procedure.
Figure 1B:
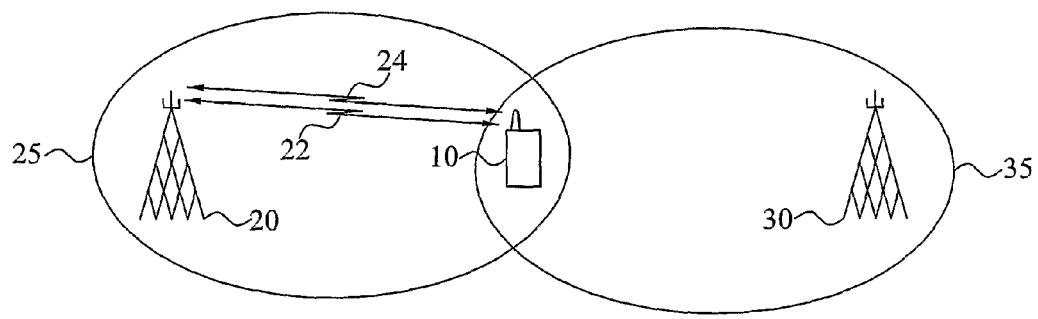
Figure 1C:
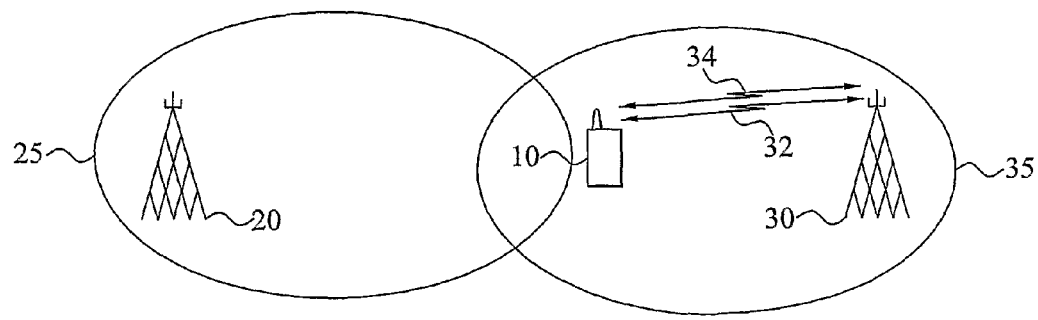
Figure 2A:
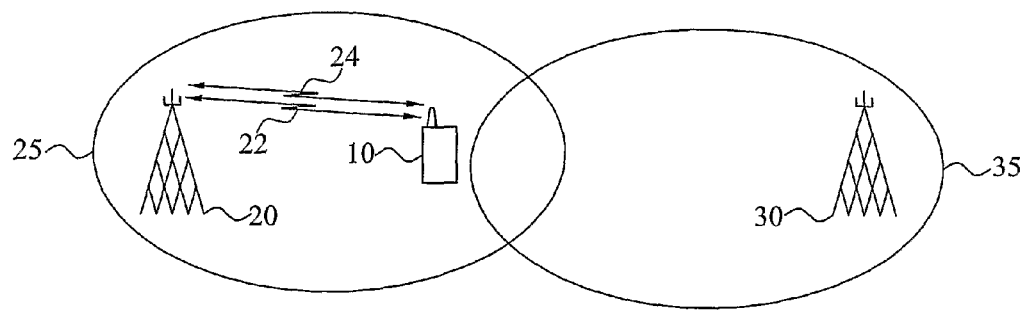
FIGS. 2A-2C are diagrams illustrating a soft handover procedure.
Figure 2B:
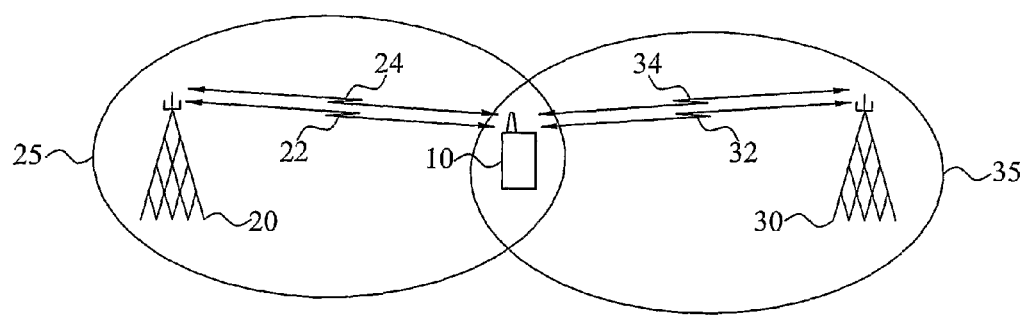
Figure 2C:
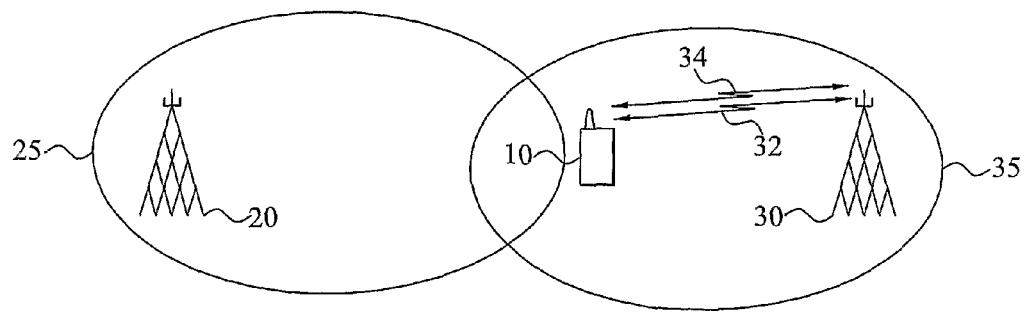

Throughout the drawings, the same reference characters will be used for corresponding or similar elements.

The technology described in this application relates to cell changes for mobile user terminals in a cellular network or system and in particular to performing such cell changes for mobile user terminals having multiple simultaneously allocated radio transmission resources.

The cell change procedure encompasses any procedure in which a mobile user terminal moves from a radio coverage area of at least one (serving) cell to a radio coverage area of at least one new cell. In this cell change procedure, radio transmission resources employed by the user terminal for communication with a base station of the at least one current cell are exchanged by radio transmission resources allocated to the mobile user terminal for conducting communication with a base station of the at least one new cell. This means that the expression "cell change" procedure is employed broadly and includes procedures denoted handover, cell change and cell re-selection in the art.

The technology described in this application is applicable to a communications system in which the mobile user terminal has multiple, i.e. at least two, radio transmission resources simultaneously allocated for communication with at least a current serving base station. Such a communications system is generally denoted a multi-carrier system, where multiple radio transmission resources are allocated for transmitting data to and/or receiving data from a given user terminal. Examples of radio transmission resources employable for transmitting data over a radio interface in a multi-carrier system are frequencies, time slots, Orthogonal Frequency Division Multiplexing (OFDM) chunks and channelization codes.

Radio transmission resources can be visualized as the division of the total radio resource into orthogonal, i.e. non-overlapping, pieces. Ideally, the simultaneous use of different radio transmission resources does not cause any interference between them. In practice, some interference may be present due to the difficulty or expense of perfect isolation of the radio transmission resources. Examples include power leakage into adjacent frequencies, channelization code orthogonality loss in time dispersive channels, etc. Specifically, the technology described in this application pertains to situations where a logical data flow associated with a mobile user terminal is mapped onto multiple radio resource units. A logical data flow contains data with a similar purpose and characteristics such as paging information or user data.

In Global System for Mobile communications (GSM) systems, including General Packet Radio Service (GPRS) and its evolution through Enhanced Data rates for GSM Evolution (EDGE) technology to Enhanced GPRS (EGPRS), hard handover is utilized and service coverage and handover robustness are challenges in commercial networks. The cell change procedure would improve both these areas without the cost and impact of introducing soft handover or fast switching. In (E)GPRS, multiple radio transmission resources are simultaneously allocated to a logical data flow, e.g. a Temporary Block Flow (TBF), of a given user terminal today in the form of multiple time slots on a frequency. The frequency may change through time in accordance with a frequency hopping sequence, but the same user terminal does not utilize multiple frequencies on the same link simultaneously. An extension of GPRS and EGPRS to enable the simultaneous use of multiple frequencies, in addition to multiple time slots, is a possibility. The technology described in this application can therefore advantageously be applied to GSM systems with GPRS and EGPRS.

OFDM is likely to be a key radio technology in the long term evolution of cellular networks. In OFDM, the radio resources in terms of frequency spectrum and time are divided into "chunks" that contain a certain number of OFDM sub-carriers (frequency) and OFDM symbols (time). A chunk is the smallest radio transmission resource that can be scheduled to a user and the transmission of simultaneous multiple chunks to a single user in a single logical data flow is expected to be common.

It may be desirable to avoid the costs and complexity of soft handover and fast switching in future cellular networks without jeopardizing service coverage and handover robustness. Therefore, the technology described in this application can advantageously be implemented in OFDM-based communications systems where OFDM chunks are the radio transmission resources allocated to a user terminal.

Most channels in Code Division Multiple Access (CDMA) systems utilize soft handover so the performance benefits of implementing the technology described in this application in CDMA-based systems for these channels may be limited. However, channels like the High Speed Downlink Shared Channel (HS-DSCH) in High Speed Downlink Packet Access (HSDPA) that do not use soft handover may benefit from the cell change procedure. In this case, the multiple radio transmission resources simultaneously allocated to a given user terminal are channelization codes.

As has been mentioned above, the cell change procedure is applicable to a multi-carrier system in which a user terminal has multiple radio transmission resources simultaneously allocated for communication with a base station or other communicating network node. These multiple radio transmission resources could be downlink resources, i.e. employed by the base station for transmitting data to the user terminal. In an alternative implementation, the multiple resources are uplink resources utilized by the user terminal for transmitting data to the base station. It is also anticipated that a portion of the radio transmission resources available for the user terminal could be downlink resources, whereas the remaining portion of the available resources are uplink resources. In such a case, the user terminal has $N_1$ radio transmission resources allocated for uplink communication with the base station and $N_2$ radio transmission resources allocated to downlink communication with the base station. In an embodiment $N_1=N_2 \geq 2$ and in another embodiment $N_1 \neq N_2$ and at least one of $N_1$, $N_2$ is equal to or larger than two.

It is of course possible that the user terminal, in addition, has radio transmission resource(s) allocated for communication with a base station associated with another cell.

The cell change method can be seen as a hybrid between the previously disclosed soft and hard handover procedures (see FIGS. 1A-1C and FIGS. 2A-2C) and is therefore denoted phased handover herein. This phased handover has the advantages of soft handover in terms of macro diversity but provides this macro diversity without introducing the costs and complexity of soft handover. This means that high service coverage and handover robustness in the same class as provided by soft handover can be obtained with a cost and complexity in the same class as provided by hard handover.

Figure 3:
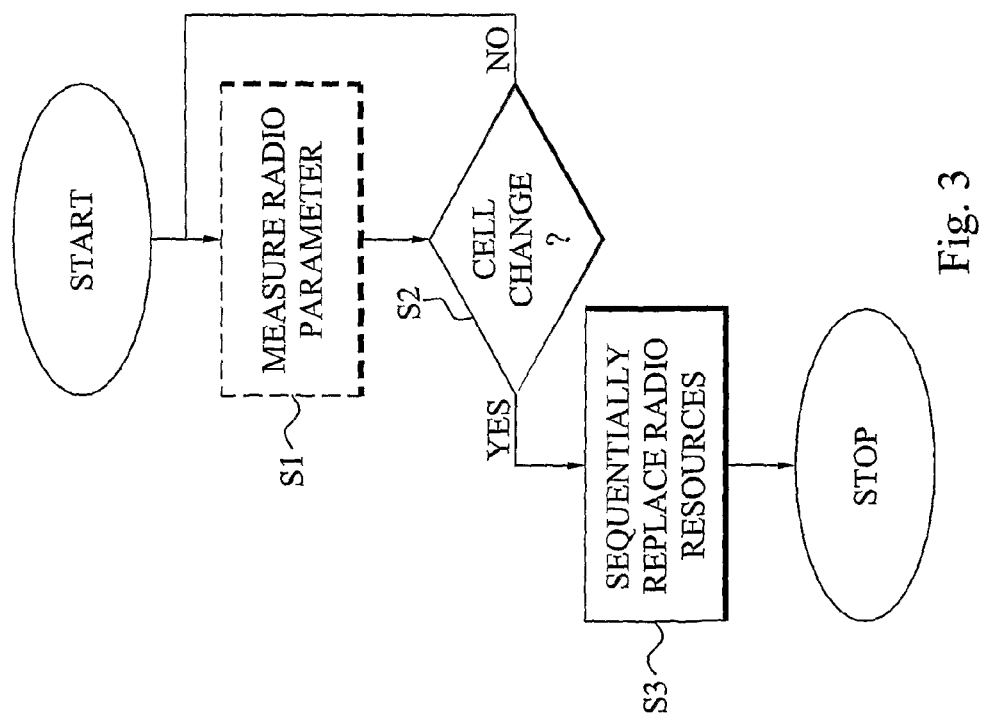
FIG. 3 is a flow diagram illustrating a cell change method according to a non-limiting, example embodiment.

FIG. 3 is a flow diagram of a cell change method according to an embodiment. The method starts in the optional step S1, where radio parameter(s) is (are) measured. This radio parameter measurement is performed as a basis for deciding whether a cell change is needed and should be initiated. The radio parameter measurement can be performed according to prior art techniques. This means that radio quality measurements can be performed by the user terminal to obtain a link quality metric representative of the quality of the radio link between the user terminal and current serving base station(s) and/or neighbor base station(s). The most widely used link quality metrics in this context are simply received signal strength or carrier-to-interference (C/I) ratio (or related measures). In such cases, the user terminal estimates this signal strength or C/I based on signals received from the current serving base station(s) and/or neighbor base station(s).

Correspondingly, the radio measurements of step S1 can also, or in addition, be performed by a current serving base station, preferably based on signals received from the user terminal and/or other base stations, and/or by neighboring base stations.

It is also anticipated that other radio parameters than radio link quality metrics can be measured in step S1, including e.g. measuring or estimating cell load in a current cell and/or a neighbor cell.

The measurements or estimations performed in step S1 can be conducted continuously by the relevant unit (user terminal and/or base station), periodically, intermittently, at pre-defined time instances and/or based on requests for measurement data.

It should be obvious to the skilled person from the discussion above that the particular radio parameter(s) measured or estimated is not decisive for the applicability of the technology described in this application and any radio parameter, including radio link quality and cell load parameter, utilized in the art can also be used in this step S1. Correspondingly, the unit(s) performing these parameter measurements is also not decisive. However, it is preferred to select a radio parameter to measure and perform these measurements by units in a manner that leads to an effective cell change procedure in terms of initiating the cell change at an appropriate time instant and selecting appropriate cells to be involved in the procedure.

In either case, these radio parameters measurements and estimations are used for determining whether a cell change procedure should be initiated in step S2. This means that in this step S2, it is detected whether there is, based at least partly on the measured radio parameter(s), a need for a change of cells for a given mobile user terminal.

Corresponding to the discussion above in relation to performing the radio parameter measurements, the actual unit that makes the decision of whether a cell change is to be initiated in step S2 is not decisive. This means that the detection of a need for a cell change can be performed by the user terminal itself, a current serving base station, a neighbor base station, a control network node connected to the serving/neighbor base station or collectively by at least two of the mentioned units.

This detection of a need for cell change in step S2 may, for example, be realized by comparing an estimated signal strength representative of the radio link between the user terminal and the serving base station with a quality threshold. If the current signal strength is lower than a minimum threshold, a cell change need could be present. Correspondingly, if the signal strength received by the user terminal from a neighbor cell, or the signal strength difference between a neighbor cell and the current serving cell, exceeds a threshold, cell change could be initiated. This threshold-based detection of the need for cell change can of course be applied to other measured radio parameters than received signal strength.

If there is a no actual need for a cell change in step S2, the method returns to step S1 where new quality measurements are performed. This means that the loop represented by steps S1 and S2 is preferably performed throughout the ongoing communications session involving the user terminal. If a need for a cell change is detected in step S2, the method continues to step S3.

In a first embodiment of this step S3, the cell change is performed by sequentially, i.e. step-by-step, replacing the multiple radio transmission resources allocated to the mobile user terminal for communication with the current base station in the current cell with radio transmission resources allocated to the user terminal for communication with at least one base station having an associated cell different from the current cell. This means that the radio transmission resources simultaneously allocated to a user terminal are modified sequentially and not all at once. This is in clear contrast to the prior art soft and hard handover and fast switching, in which all radio resources are replaced, duplicated or handed over collectively in a single step. By switching to radio transmission resources in a new serving base station in steps, rather than all at once, macro diversity is provided without introducing the costs and complexity of soft handover and fast switching.

Once the desired amount of multiple transmission resources have been replaced sequentially the method ends.

In an alternative embodiment of this sequential replacing step, the mobile user terminal has at least a first radio transmission resource allocated to a first base station associated with a first cell and at least a second radio transmission resource simultaneously allocated to the same first base station in an associated second cell different from the first cell, or to a second different base station associated with a second cell. Thus, the mobile user terminal has multiple simultaneously allocated resources, but at least two of these multiple resources are allocated in different cells. Furthermore, raw (bit) data to be transmitted by the user terminal or the first base station using the at least first radio transmission resource is different from the raw data to be transmitted by the user terminal or the first/second base station by means of the at least second resource. Thus, in clear contrast to the prior art soft handover, duplicate data is not simultaneously transmitted using the first and second resources. It is well known to the skilled person that data transmitted during soft handover on the duplicate resources may be processed differently, e.g. by employing different scrambling codes, in the two involved cells. However, the unprocessed raw data transmitted on the duplicate resources in the prior art soft handover is always the same.

In step S3, the at least first and second radio transmission resources are sequentially replaced with radio transmission resources allocated to the user terminal for communication with at least one base station. This at least one base station could be a third base station having a third associated cell, the first or second base station having a third associated cell or actually the first or second base station with the associated first or second cell.

It is anticipated that the sequential resource replacement can involve more replacement steps than the number of multiple radio transmission resources allocated to a user terminal. For example, if a mobile user terminal has two radio transmission resources simultaneously allocated for communication with a first base station in a first cell, a first resource can be replaced in a first replacement step with a resource allocated to the user terminal for communication with a second base station in a second cell. In a next step, the resource allocated in the first replacement step is replaced with a resource allocated to the user terminal for communication with e.g. the second base station but in a third cell associated with the second base station. The last resource allocated in the first cell could then be allocated in the third replacement step with another resource allocated to the user terminal in the third cell for communication with the base station.

Thus, the phased handover is very flexible and can handle the case where a mobile user terminal moves through a communication system and becomes (temporarily) connected to different base stations and is (temporarily) present in different cells.

Figure 4A:
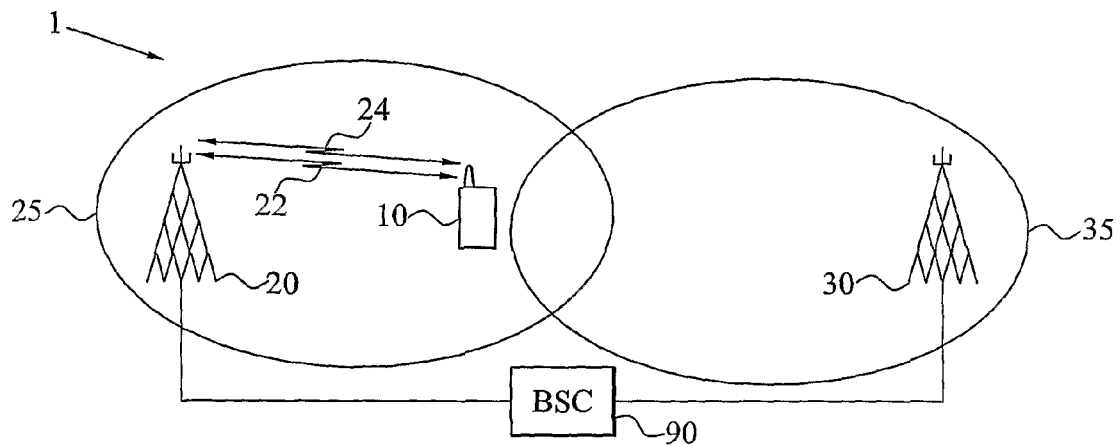
FIGS. 4A-4C are diagrams illustrating a cell change procedure performed in a cellular radio communications system according to non-limiting, example embodiment.
Figure 4B:
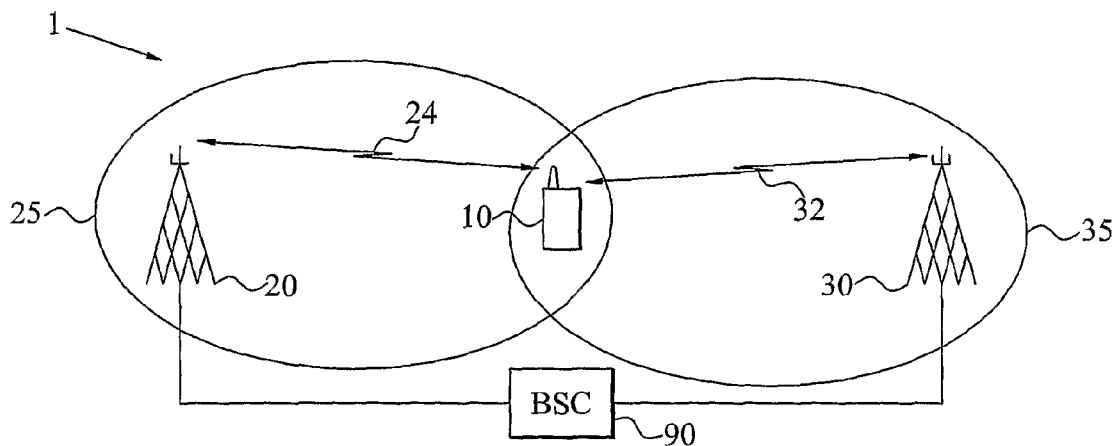
Figure 4C:
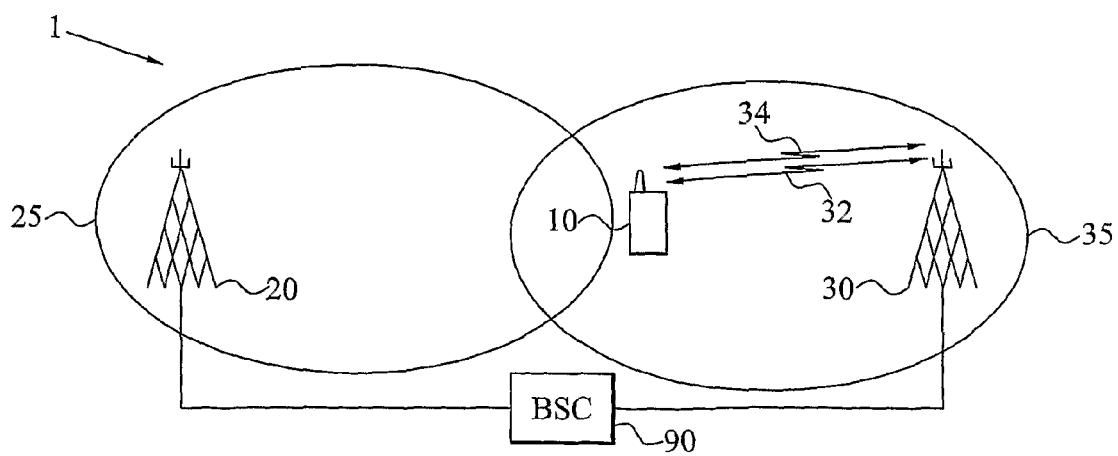

FIGS. 4A to 4C are diagrams illustrating a portion of a communications system 1 employing the cell change procedure according to an embodiment. In FIG. 4A, the system 1 has been illustrated with two base stations 20, 30 having two different radio coverage areas or cells 25, 35, in which they provide communications services to connected user terminals 10. In this illustrative example, a mobile user terminal 10 is present in a first cell 25 managed by a first base station 20. The user terminal 10 has, non-limitedly, two simultaneously allocated parallel radio transmission resources 22, 24 that can be used for transmitting data to the base station 20 or, in an alternative implementation, for receiving data from the base station 20. The allocation of these multiple resources 22, 24 are typically performed by the base station 20 or a control network node 90, represented by a Base Station Controller (BSC) in the figure, connected to the base station 20.

The mobile user terminal 10 starts to move away from the first base station 20 and approaches the second base station 30. During this movement, the user terminal 10 and/or base stations 20, 30 perform radio quality measurements. The user terminal 10, one of the base stations 20, 30 or the BSC 90 then uses these measurements for determining when to trigger a cell change procedure or phased handover.

Once the phase handover procedure is initiated, the allocation of one of the radio transmission resources 22 in the first cell is withdrawn as a new radio transmission resource 32 is allocated in the second cell to the user terminal 10, which is illustrated in FIG. 4B. This means that at this instance, the user terminal 10 has one radio transmission resource 24 allocated in the first cell 25 and one resource 32 allocated in the second cell 35.

Different scenarios for the use of radio resources 24, 32 in the first 25 and second 35 cells are possible during the phased handover. In a first possible implementation, the resources 24, 32 in the different cells 25, 35 and allocated to the same user terminal 10 can be used for (uplink/downlink) transmission of data that is related on the physical layer. For example, the same user (raw bit) data can be transmitted on the two resources 24, 32 with different channel coding. Alternatively, user data can be transmitted using one of the radio transmission resources 32, whereas the other resource 24 is employed for transmission of extra redundancy, e.g. in the form of additional parity bits. In both these cases, the data transmitted on the two radio resources 24, 32 are based on common information and a direct coding gain on the physical layer is achieved. The expression "based on common information" encompasses the case where the same data is transmitted on both resources 24, 32, though possibly delayed in time, or where data packets comprising at least a portion of the information transmitted by means of one of the resources 32 are transmitted using the other resource 24. Also redundancy versus "original" data is regarded as based on common information.

In an alternative scenario, the radio transmission resources 24, 32 are used for transmission of data in the first 25 and second 35 cells that is related on higher layers but independent on the physical layer. In such a case, the data could be related on the data link layer, network layer, transport layer, session layer, presentation layer and/or application layer. For example, the user terminal 10 could request the downloading of a web page using the resources 24, 32. In such a case, objects belonging to this same web page can be provided on the different radio transmission resources 24, 32. This means that there is a macro diversity gain on higher layers but no direct gain in link performance.

The data transmitted in the communications system 1 can be logically divided into user plane and control plane. The user plane data is the information that is interesting from the user point of view, i.e. the data that the user wants to transfer. The control plane data carries system-internal control signaling, for instance radio resource management signaling. Examples of control plane signaling are reports from the mobile user terminal 10 to the network of the quality of the radio links between the terminal 10 and its serving base station(s) 20 and other neighboring base stations 30 in the vicinity, and commands from the network to the terminal 10 to perform a handover to another cell 35.

The user plane and control plane could be treated differently. For instance, the user plane resources in the first 25 and second 35 cells could be used to transmit data that is independent on the physical layer to maintain the user data throughput throughout the handover, while the control plane resources in the first 25 and second 35 cells could be used to transmit information directly related to the same control plane signaling, in order to maximize the robustness of the signaling link.

The transition from the situation in FIG. 4A to FIG. 4B, thus, represents the first step in the sequential resource replacement of the cell change procedure. In the second step, the allocation of the remaining resource 24 in the first cell 25 is withdrawn and a new radio transmission resource 34 is allocated to the user terminal 10 in FIG. 4C. These two resource replacements are two distinct steps, which are performed sequentially and therefore separated in time from each other. Note also that a same total number of resources 22, 24; 32, 34 are allocated to the user terminal 10 throughout the whole cell change procedure. In this way the phased handover is similar to the hard handover procedure and is not marred by the demand of more transmission and air interface resources as soft handover requires. However, even though the total number of allocated resources is not increased during the phased handover, macro diversity can still be obtained, due to this sequential replacement of radio transmission resources.

In FIGS. 4A to 4C, the mobile user terminal moves from communicating with a first base station in a first cell to communicating with a second different base station in a second different cell. The technology described in this application can however also be applied to so-called intra-site handover, where a mobile user terminal moves from a first cell or sector managed by a given base station into a second cell or sector managed by the same base station. This scenario is schematically illustrated in FIGS. 5A to 5C.

Figure 5A:
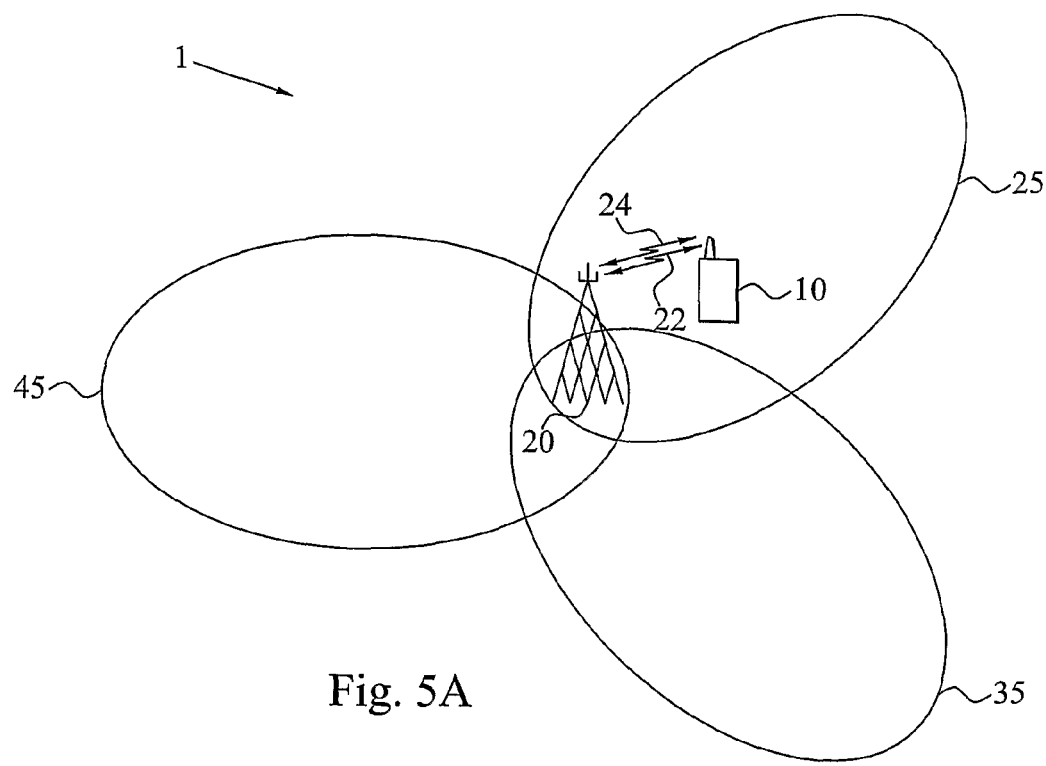
FIGS. 5A-5C are diagrams illustrating a cell change procedure performed in a cellular radio communications system according to another non-limiting, example embodiment.
Figure 5B:
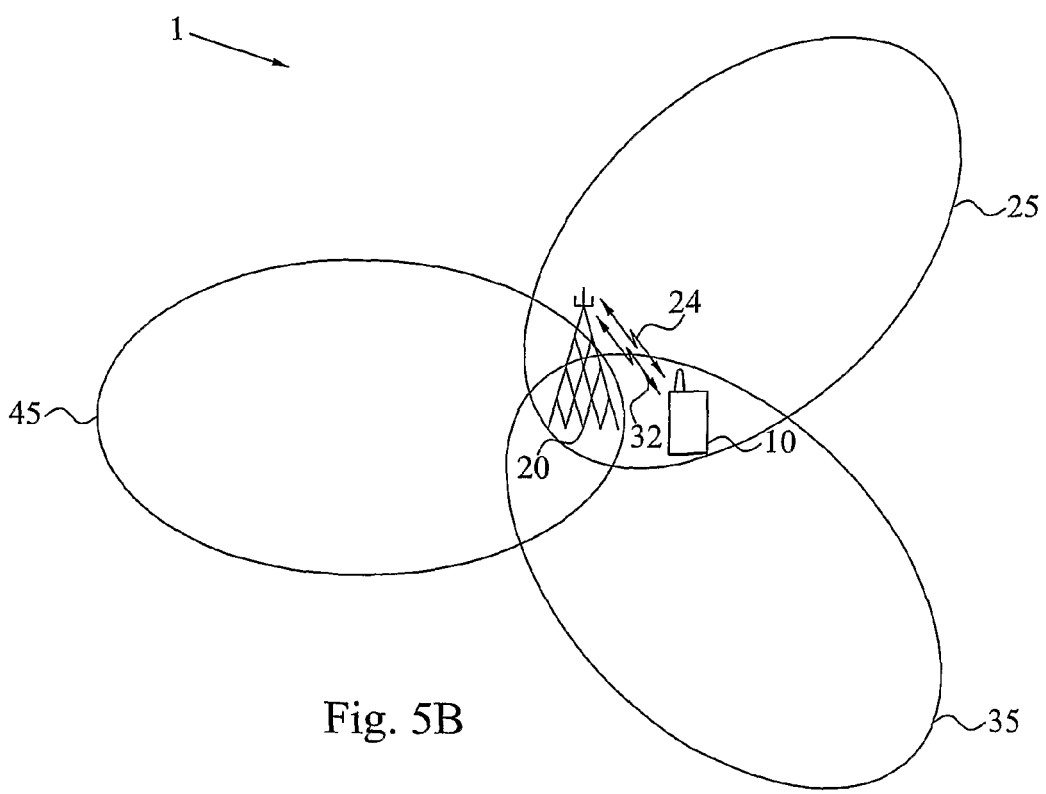
Figure 5C:
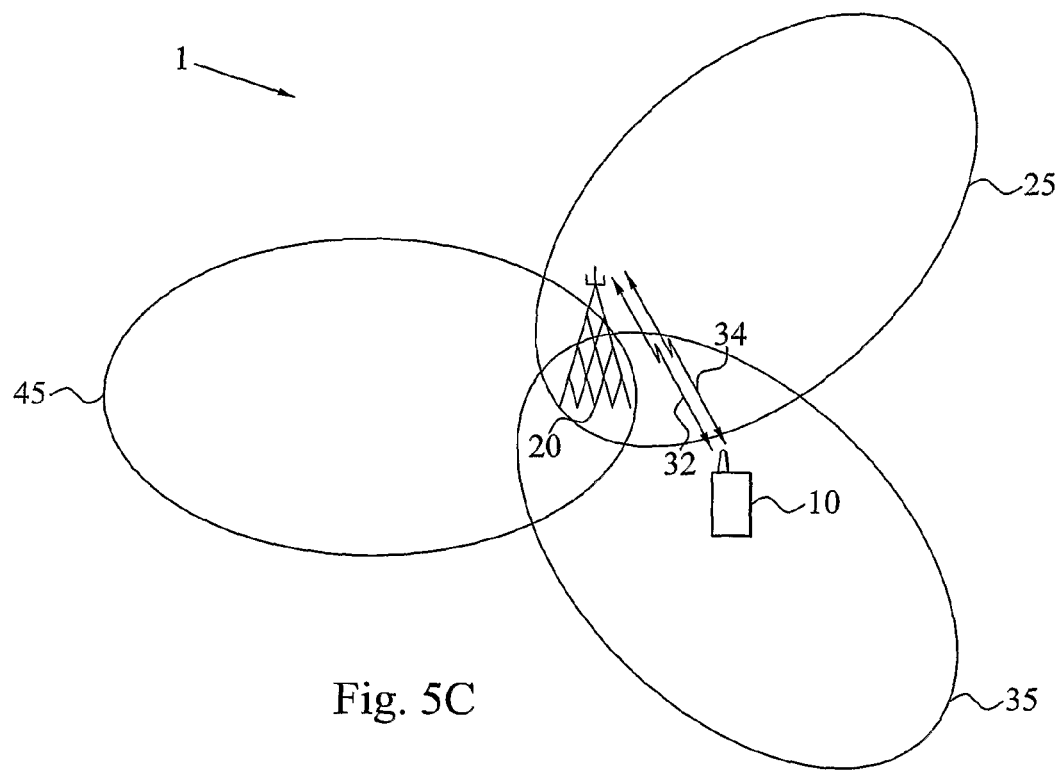

FIG. 5A illustrates a portion of the multi-carrier cellular communications system 1 with a base station 20 being associated with and serving multiple, non-limitedly exemplified by three, different sectors or cells 25, 35, 45. The base station 20 has access to a first set of radio transmission resources for use when communicating with user terminals present in a first 25 of its cells, a second resource set to use in a second cell 35 and correspondingly, a third set of resources that are allocated for communication in the last third cell 45.

In FIG. 5A, a mobile user terminal 10 is present in the first cell 25 served by the base station 20. The user terminal 10 has, non-limitedly, been allocated two radio transmission uplink resources 22, 24 (or two radio transmission downlink resources) for transmission of data to the base station (20) (or reception of data from the base station). The mobile terminal 10 starts to move towards the second cell 35 managed by the base station 20. At a particular point in this movement, a cell change procedure is triggered by the user terminal 10, the base station 20 or some other network node.

The two uplink (or downlink) resources 22, 24 allocated to the user terminal 10 in the first cell 25 are sequentially replaced in two (or possibly more) steps with two uplink (or downlink) resources 32, 34 allocated to the user terminal for uplink (or downlink) transmission in the second cell 35. FIG. 5B illustrates the scenario where one of the radio transmission resources allocated to the user terminal 10 in the first cell 25 has been replaced by a transmission resource 32 allocated to the terminal 10 in the second cell 35. Correspondingly, in a next step, the remaining radio transmission resource of the first cell 25 is replaced by a resource 34 of the second cell 35, see FIG. 5C. Also in this intra-site cell change procedure, the sequential replacement of radio transmission resources is performed by stepwise replacing resources 22, 24 allocated in a first cell 25 by resources 32, 34 allocated in a second cell 35 without changing a total number of resources allocated to the user terminal 10.

It is anticipated that more than two base stations and cells may be involved in the cell change procedure. In addition, more than two (parallel) radio transmission resources may be sequentially replaced with radio resources allocable in other cell(s). These aspects are illustrated in more detail with reference to FIGS. 6A to 6D.

Figure 6A:
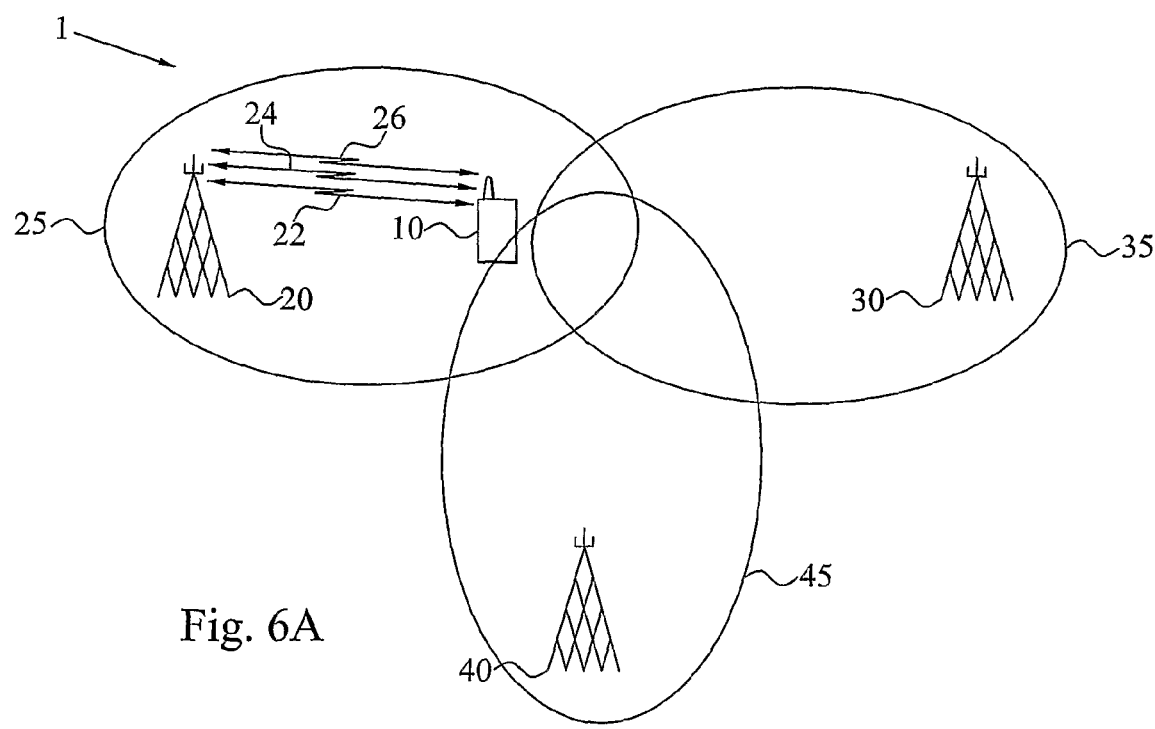
FIGS. 6A-6D are diagrams illustrating a cell change procedure performed in a cellular radio communications system according to a further non-limiting, example embodiment.

FIG. 6A schematically illustrates a portion of a cellular communications system 1 employing the cell change technique. This system 1 has been represented by three cells 25, 35, 45, each being served by a respective base station 20, 30, 40. A mobile user terminal 10 is currently present in a first cell 25 and is involved in communication with the base station 20 of this first cell 25. As a consequence, the mobile user terminal 10 has been allocated multiple, in this example three, radio transmission resources 22, 24, 26 for conducting this communication.

The user terminal 10 starts to move away from the current serving base station 20 and into an area where the radio coverage of all three cells 25, 35, 45 partly overlaps. At a given instance a need for a cell change is detected and the cell change procedure is initiated. As is illustrated by these FIGS. 6A to 6D, the allocated radio resources are sequentially replaced in, in this illustrative example, three steps. In a first step (see transition from FIG. 6A to 6B) one of the resources 22 is replaced by a resource 32 allocated to the user terminal 10 in the second cell 35. At this instance, the user terminal 10 can perform the communication with the first 20 and second 30 base stations. As was mentioned in the foregoing text, related or non-related data can then be transmitted on the radio resources 24, 26 of the first cell 25 and the radio resource 32 of the second cell 35.

Figure 6B:
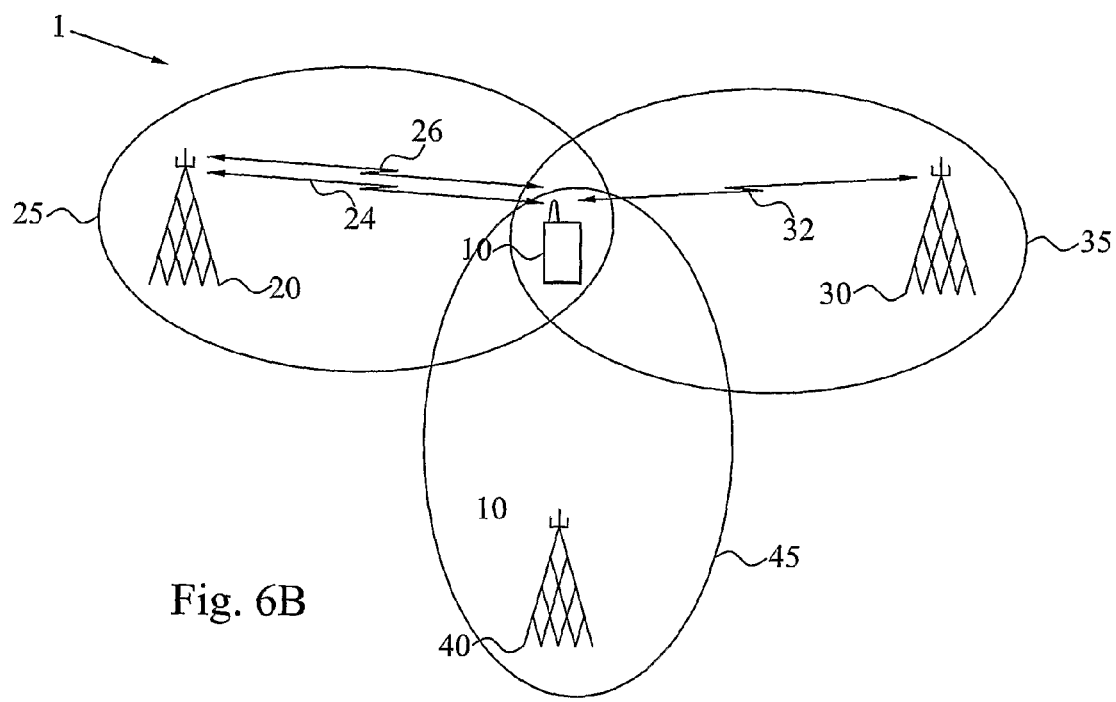
Figure 6C:
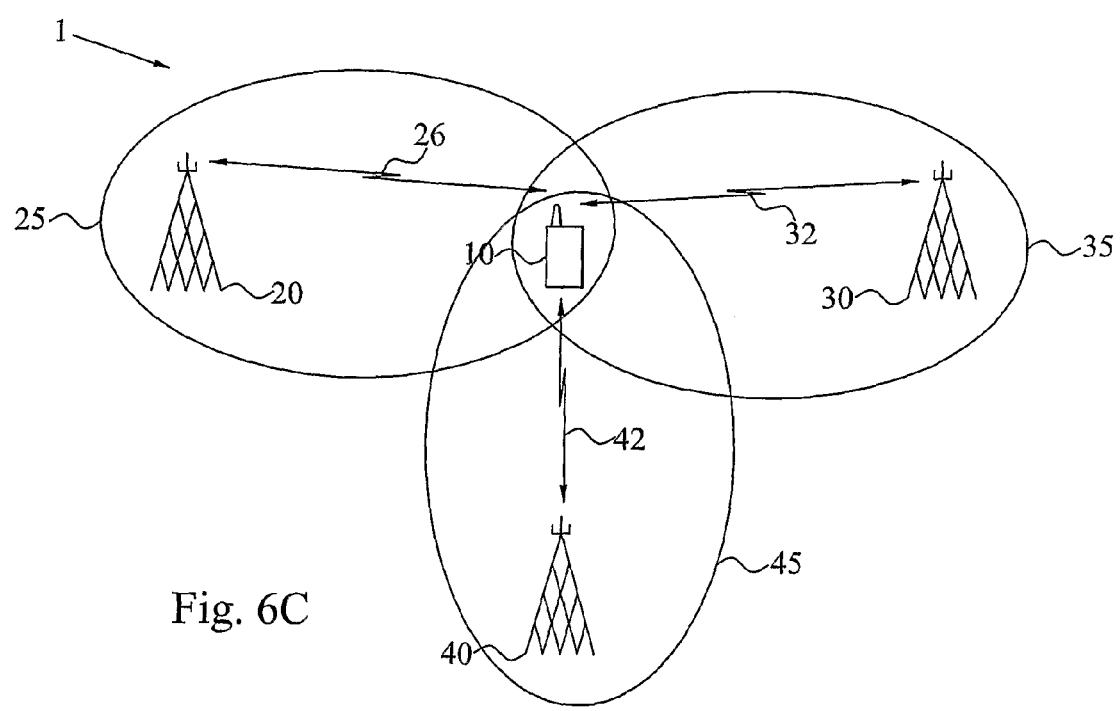

In the next step, as illustrated by going from FIG. 6B to 6C, another of the resources 24 of the first cell 25 is replaced by a resource 42, but in this case the resource 42 is usable by the terminal 10 for communicating with the base station 40 of the third cell 45. At this instance, the mobile terminal 10 has radio transmission resources 26, 32, 42 allocated in each of the three cells 25, 35, 45 and communicates with all three base stations 20, 30, 40. The possibilities of introducing macro diversity are even more versatile in this case.

Figure 6D:
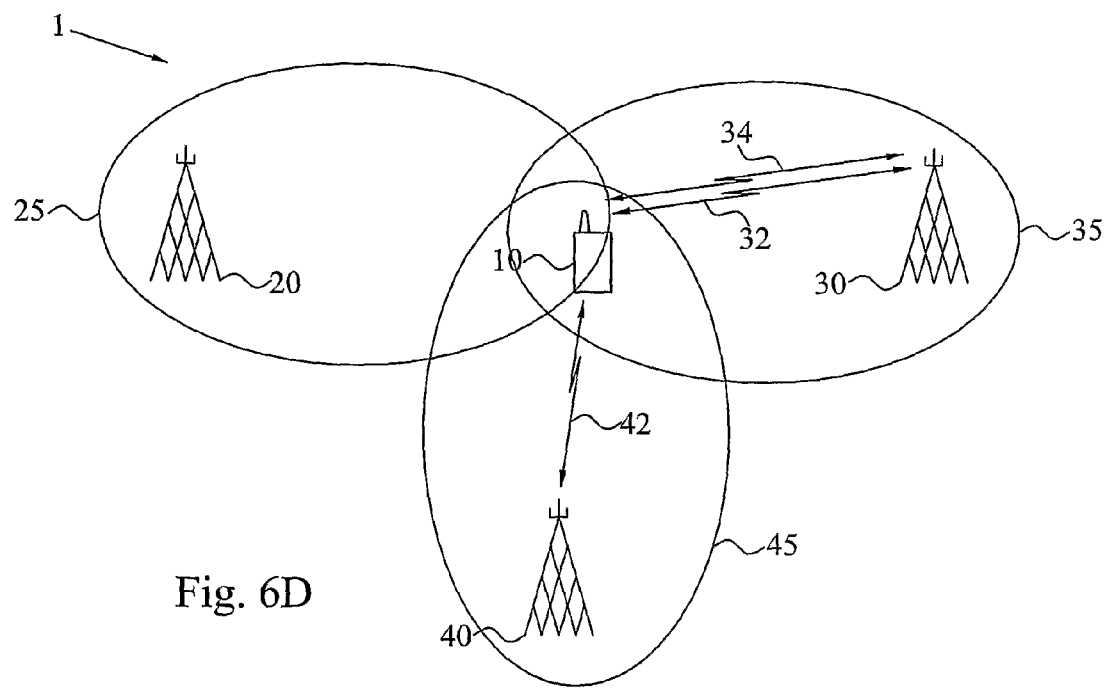

The user terminal 10 continues its movement away from the first cell 25 and the final resource 26 allocated in this cell 25 is replaced in FIG. 6D by a second radio transmission resource 34 allocated to the terminal 10 in the second cell 35.

All the radio transmission resources 22, 24, 26 originally allocated to the user terminal 10 at the start of the cell change procedure have now been sequentially replaced by resources 32, 34, 42 for use in the destination cells 35, 45. Thus, as is clear from FIG. 6D, the cell change procedure can end with a situation in which the user terminal 10 has radio transmission resources 32, 34, 42 allocated by different base stations 30, 40. If the mobile user terminal 10 continues the movement, e.g. further into the third cell 45, the two radio transmission resources 32, 34 allocated in the second cell 35 will, correspondingly, be sequentially replaced with radio resources in the third cell 45.

Similar to the principle above that the cell change procedure can end with a situation in which the user terminal has radio transmission resources allocated in different cells, the cell change can be started from a situation where the user terminal has resources allocated by different base stations, which will be described further herein with reference to FIGS. 8A to 8D.

In the previous examples of cell change procedure, single radio transmission resources have been replaced sequentially. The technology described in this application is, however, not limited thereto. This means that in at least one step of the multi-step (sequential) resource replacement, a set of at least two resources can be replaced by other resources. This is schematically illustrated by FIGS. 7A to 7D.

Figure 7A:
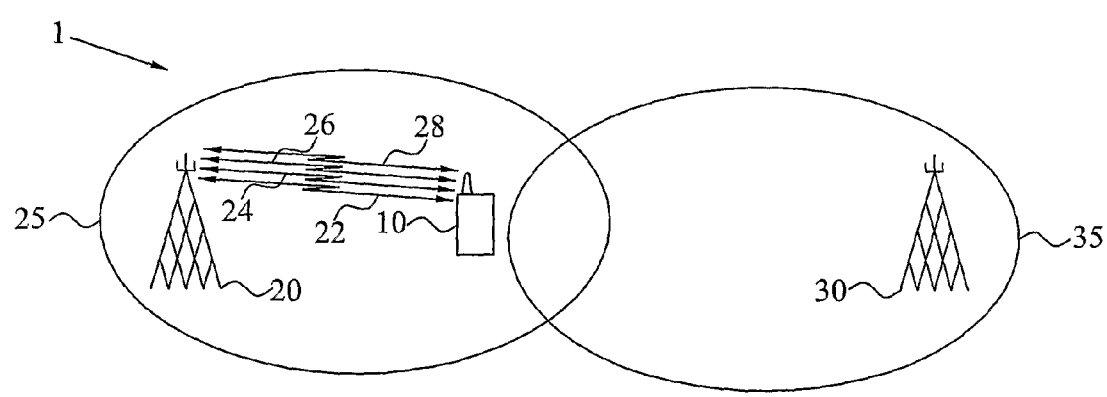
FIGS. 7A-7D are diagrams illustrating a cell change procedure performed in a cellular radio communications system according to yet another non-limiting, example embodiment.
Figure 7B:
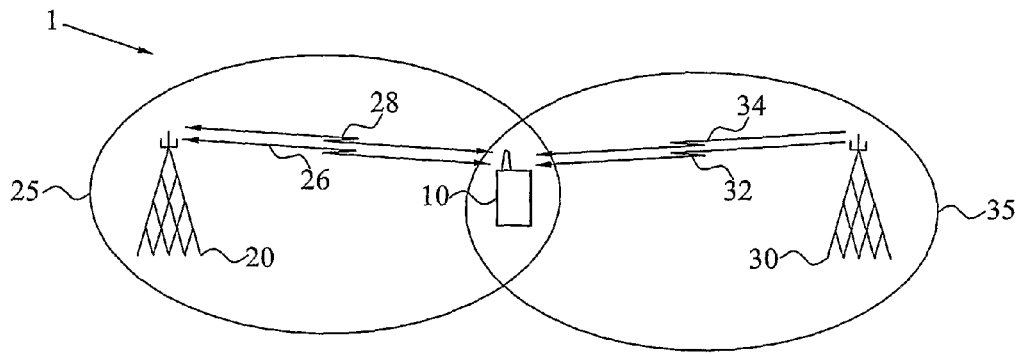

FIG. 7A illustrates two cells 25, 35 and base stations 20, 30 of a cellular communications system 1. A mobile user terminal 10 is present in the first cell 25 and has been allocated, in this example, four radio transmission resources 22, 24, 26, 28 for conducting communication with the base station 20 of this cell 25. The user terminal 10 moves away from the current serving base station 20 and into the radio coverage area 35 of the second base station 30. In a first step of the sequential resource replacement of the cell change, a set of multiple (two) resources 22, 24 of the originally allocated resources 22, 24, 26, 28 is replaced by multiple resources 32, 34 allocated to the terminal 10 by the second base station 30, see FIG. 7B. At this instance in the cell change procedure, the user terminal 10 therefore has two resources 26, 28 allocated for conducting communication with the old base station 20 and two resources 32, 34 allocated for communicating with the new base station 30.

Figure 7C:
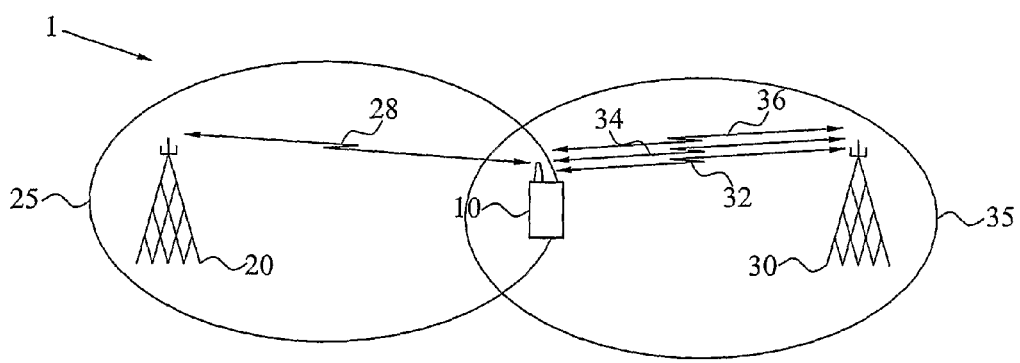
Figure 7D:
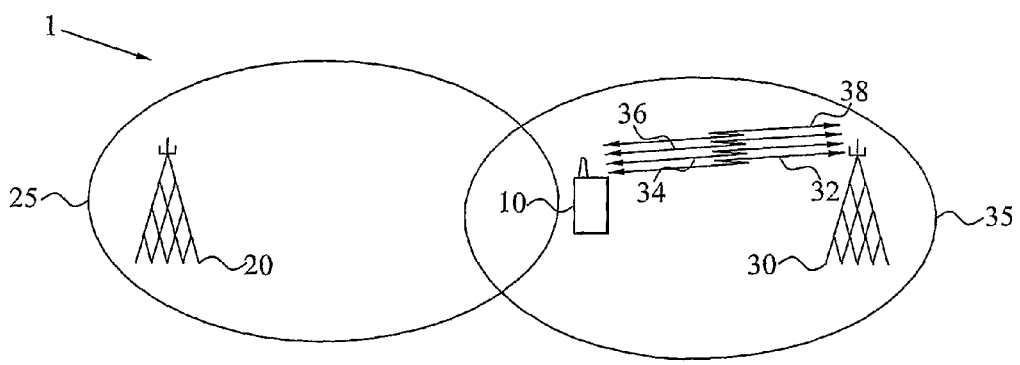

The sequential replacement of the remaining two resources 26, 28 is, non-limitedly, performed in two steps by first replacing the resource 26 in the cell 25 with a resource 36 in the destination cell 35, see FIG. 7C. In FIG. 7D, the last resource 28 is replaced by a new resource 38 in the second cell 35. It is though evident to the skilled person that the final two radio transmission resources 26, 28 could of course be replaced as a set and in one step as the resources 22, 24. The particular manner in which the resources are sequentially replaced can be based, at least partly, on different replacement criteria described further below, to perform the cell change in a most appropriate manner dependent on the current situation.

Figure 8A:
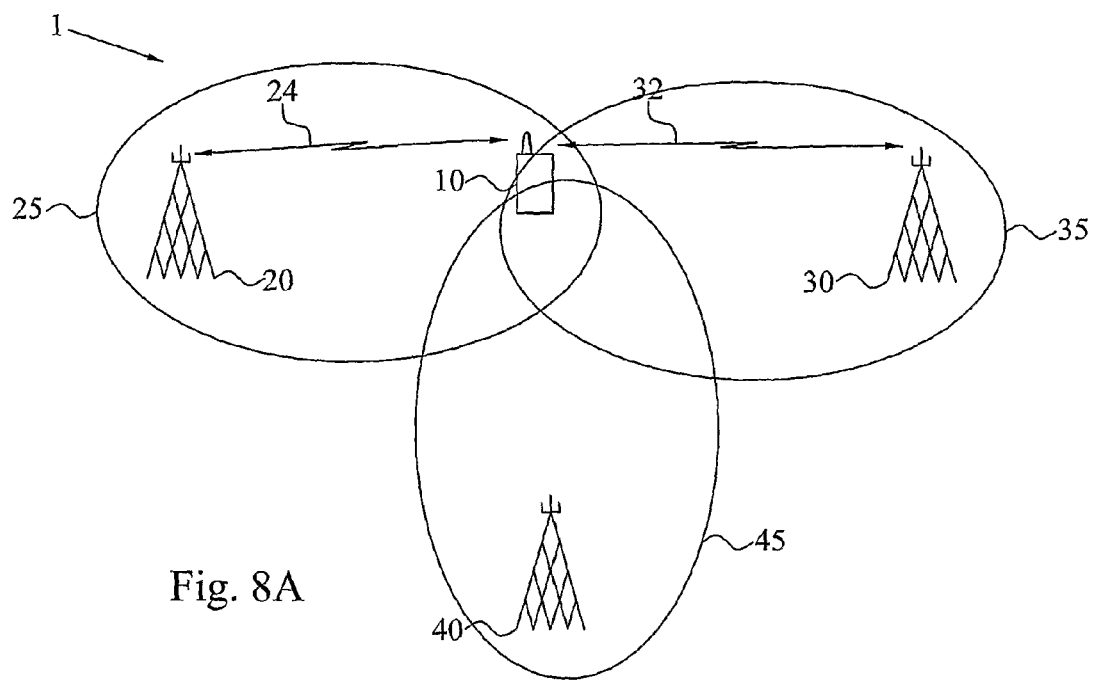
FIGS. 8A-8D are diagrams illustrating a cell change procedure performed in a cellular radio communications system according to still another non-limiting, example embodiment.

FIG. 8A illustrates three cells 25, 35, 45 and base stations 20, 30, 40 of a cellular communications system 1. A mobile user terminal 10 is present in an overlap region of the first cell 25 and the second cell 35 and has been allocated, in this example, a first radio transmission resource 24 for conducting communication with the base station 20 of the first cell 25 and a second resource 32 for conducting communication with the base station 30 of the second cell 35. The situation illustrated in FIG. 8A can have ensued from a previously performed phased handover procedure.

In contrast to typical soft handover, in the particular embodiment illustrated in FIG. 8A, raw data transmitted on the first resource 24 is different from raw data transmitted on the second resource 32. Thus, the bit stream to be scrambled, modulated, etc. by the first base station 20 (or the user terminal 10) and transmitted on the first resource 24 is different from the bit stream to be scrambled, modulated, etc. and then transmitted by the second base station 30 (or the user terminal 10) using the second resource 32. Therefore, in this embodiment, no duplicate raw data is generally sent on the two resources 24, 32. However, if for example, the user terminal has been simultaneously allocated at least two resources in one and the same first cell, possibly in addition to resources in different cells, duplicate information could then be transmitted using these at least two resources in the said first cell. Furthermore, it is anticipated that occasionally duplicate information may actually be sent on the two resources 24, 32 but this generally occurs occasionally and during limited time periods.

Figure 8B:
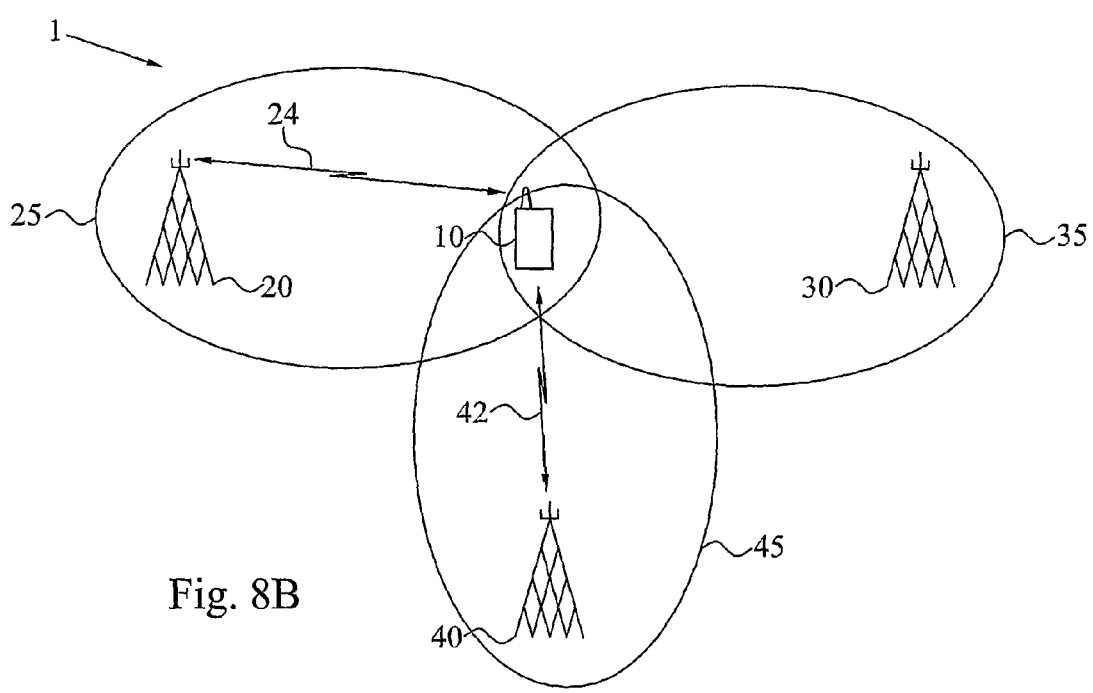
Figure 8C:
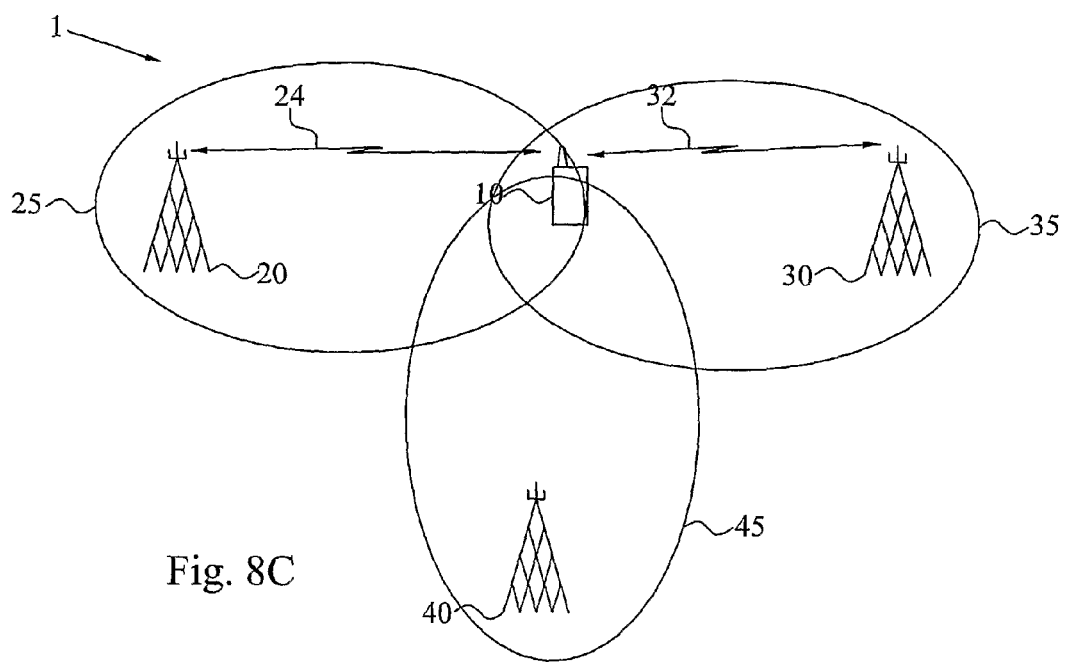
Figure 8D:
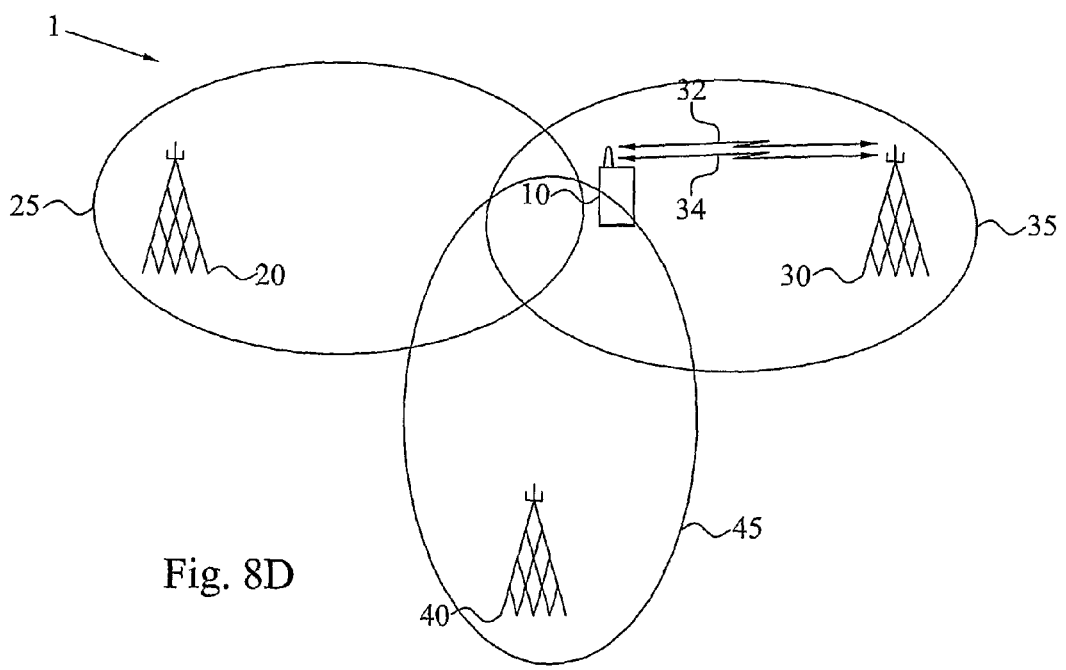

In FIG. 8B the user terminal has moved towards a third base station 40 providing communications services in a third cell 45. Therefore, in a first step of the sequential resource replacement, the resource allocated in the second cell 35 is replaced by a resource 42 allocated to the user terminal 10 in the third cell 45. The mobile user terminal 10, however, then moves back away from the third base station 40 in FIG. 8C. This means that in a second replacement step, the resource allocated to the user terminal 10 in FIG. 8C is replaced with a resource 32 to use for communication with the second base station 30 in the second cell 35. Note that in these two steps the resource allocated for communication with the first base station 20 is not affected. In FIG. 8D the user terminal 10 continues the movement towards the second base station 30 and the resource allocated in the first cell 25 is replaced in a third replacement step with a second resource 34 allocated for communication in the second cell 35.

As is evident from the discussion above, the sequential resource replacement can thus, depending on the particular movement of the mobile user terminal between different cells, involve more, less or an equal number of replacement steps as the number of resources originally allocated to the user terminal.

This means that the cell change, disclosed in FIGS. 4A to 8D and the discussion above, is very flexible in terms of the base stations and communication cells that the procedure starts from, that are involved during the actual cell change, and that the user terminal ends up in. Furthermore, there is a large flexibility in how the multiple resources are managed during the sequential replacement, implying that the number of resources replaced in each step and which base stations are involved in this replacement can be adapted to the particular situation to achieve advantageous effects in terms of macro diversity, service coverage, robustness, etc.

In a non-limiting embodiment, the resources sequentially replacing originally allocated resources are preferably resources of a same type. Thus, if the cell change procedure starts with a situation with e.g. four downlink resources allocated to the user terminal, once the cell change is completed, the user terminal still has four downlink resources allocated but for communication in at least one other cell.

If the user terminal has been simultaneously allocated two uplink resources and two downlink resources in the current serving cell, the two resource types can be handled collectively or separately. For example, the downlink resources can be separately replaced in a sequential resource replacement by two downlink resources allocated to the terminal in at least one other cell. Correspondingly, a separate sequential replacement of the uplink resources can then be performed in parallel or some period of time before or after the downlink resource replacement. If all the resources are managed collectively, one or more downlink (uplink) resources can be replaced in a first step and one or more uplink (downlink) resources are replaced in a second sequential step.

Figure 9:
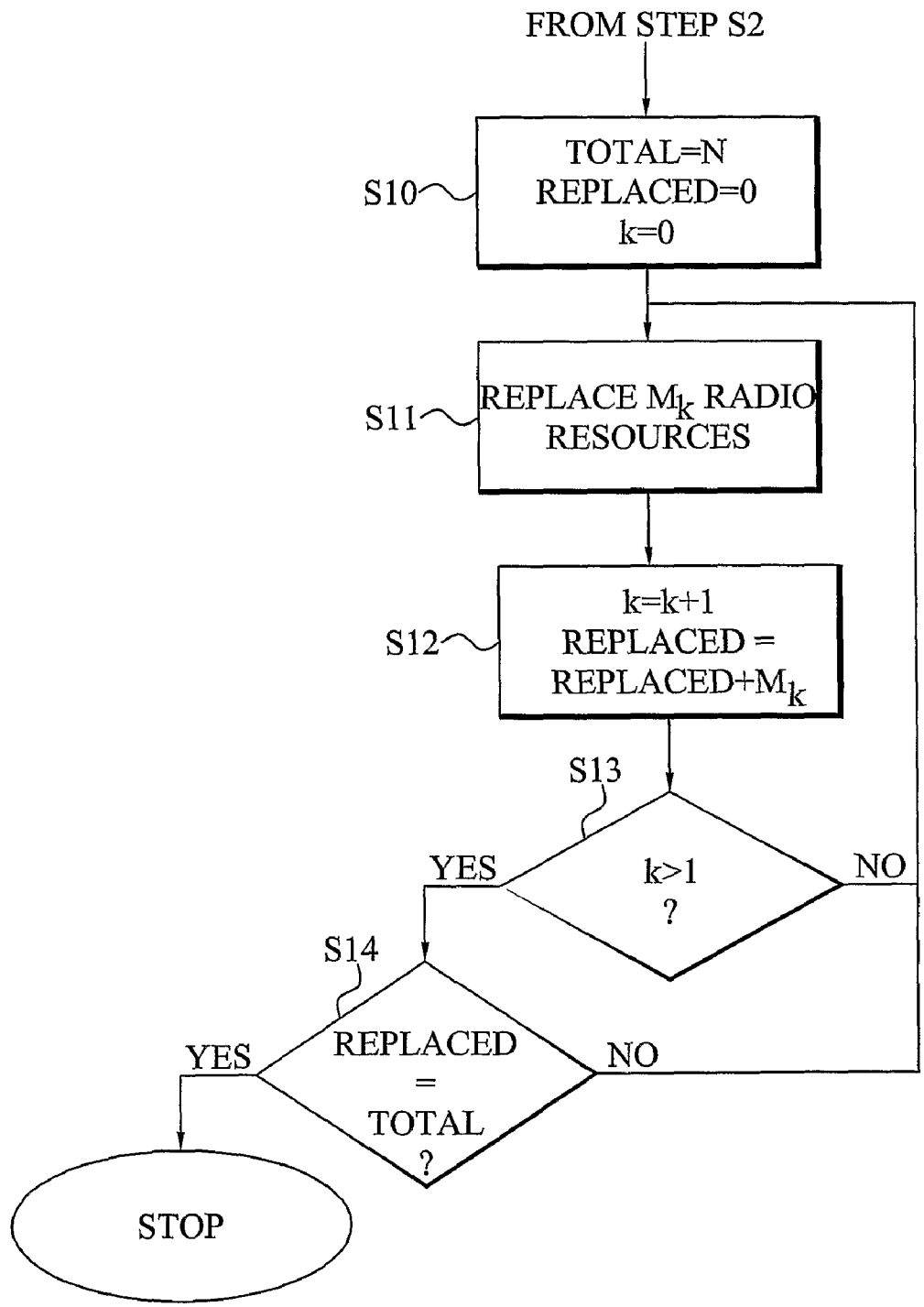
FIG. 9 is a flow diagram illustrating the sequentially replacing step of FIG. 3 in more detail according to a non-limiting, example embodiment.

FIG. 9 is a flow diagram illustrating an embodiment of the sequential resource replacing step S3 of FIG. 3. This flow diagram basically illustrates an algorithm for performing the sequential replacement. The method continues from step S2 in FIG. 3. In a next step S10, a resource counter (TOTAL) is set to the total number of resources (N) to replace by the cell change procedure. Correspondingly, a replaced counter (REPLACED), representing a total number of resources replaced, is set to zero, since no resources have been replaced yet. A step counter (k) is set to zero and represents a total number of sequential resource replacement steps that have been performed.

In a next step S11, $M_0$ radio transmission resources are replaced by resources allocated to the user terminal in at least one external or different cell. This $M_0$ number of replaced resources is equal to or larger than one but is smaller than the total number of allocated resources, i.e. $1 \leq M_0 < N$. These $M_0$ resources may be replaced with $M_0$ resources available in an external cell or be replaced with a total of $M_0$ resources available in different external cells.

In a next step S12, the step counter k is increased by one to indicate that a first step in the multiple step resource replacement has been completed. The replaced counter REPLACED is correspondingly increased by the number of resources $M_0$ replaced in this step. The next step S13 investigates whether the step counter k is larger than one, i.e. whether at least two resource replacement steps have been performed. If this is not the case, the method returns back to step S11, where now $M_1$ radio resources are replaced. This/These $M_1$ radio resource(s) can be replaced by radio transmission resource(s) in a same or different cell as the resources replacing the first $M_0$ resources. The step S12 increases the step counter k to two and the REPLACED counter is now set to $M_0+M_1$.

In this case, the criterion in step S13 is fulfilled since the counter k is currently two, which is larger than one. The method therefore continues to step S14 where it is investigated whether the replaced counter is equal to the total number of resources for the user terminal, i.e. whether REPLACED=TOTAL. If this is the case, all the previous radio transmission resources of the user terminal have been replaced and the cell change is completed. If the number of replaced resources has not yet reached the total number of resources originally allocated to the user terminal, the method continues to step S11 and a new resource replacement step is performed.

The way in which the number of resources $M_k$ to replace in step k is determined is preferably pre-defined e.g. based on different replacement criteria. It could also be possible to include a threshold check so that not more resources are replaced than the total number of originally allocated resources, i.e. to prevent $$REPLACED = \sum_k M_k$$

from exceeding TOTAL. Note however that it is possible to perform the phased handover in more replacement steps than the number of resources originally allocated to the user terminal. This is due to that the user terminal can move back and forth between different cells, which calls for resource replacements.

Figure 10:
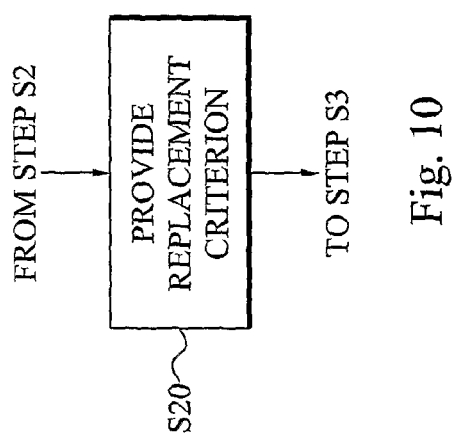
FIG. 10 is a flow diagram illustrating an additional step of the cell change method of FIG. 3.

FIG. 10 is a flow diagram of an additional step of the cell change method illustrated in FIG. 3. The method continues from step S2 in FIG. 3. In a next step S20, at least one replacement criterion is provided. This replacement criterion is used by the unit (user terminal, base station or control node) triggering the cell change procedure or by some other unit, typically control node, managing or involved in the procedure for determining how the cell change procedure should actually be performed. As has been discussed in the foregoing text, the cell change provides a flexibility of determining which resource(s) is (are) to be replaced in each step, when such a replacement is to take place and which new resource(s) is (are) to be allocated to the user terminal.

An example of such a replacement criterion that can be provided and used is the value of a cell change related timer. This timer can be arranged in the user terminal, in one of the involved base stations or a control network node. It could, e.g. be possible that each step of the resource replacement is to be performed following a pre-defined period of time following the detection of the need for cell change. Alternatively, a minimum/maximum time period could be utilized between two replacement steps in the cell change procedure. A timer can therefore be used for coordinating the timings of the cell change sub-steps.

In another example, a quality parameter representative of the radio quality for the communications link between the mobile user terminal and the original base station could be used. For example, it can be more advantageous to replace more resources in the first replacement step in conditions where the radio link quality deteriorates rapidly as compared to a situation where the link quality deteriorates more slowly. In the first case it is necessary to quickly allocate new resources in at least one destination cell since the old resources may, due to the rapidly deteriorating quality, become less useful for the user terminal. In order to provide maximum throughput it is typically advantageous to then replace a sub-set of the multiple resources as compared to only replacing a single resource in the first step.

Correspondingly, a radio quality metric representative of the radio quality in at least one destination cell into which the mobile user terminal is moving can be useful as a replacement criterion. If the quality, e.g. received signal strength, increases very slowly, it can be advantageous to extend the cell change procedure over time, e.g. by using more than two replacement steps (where applicable) and/or increasing the period of time between the execution of two replacement steps.

The buffer level in a transmit buffer arranged in the user terminal and comprising data destined to the current serving base station can also be used as a replacement criterion. If the user terminal has a lot of data to send to the base station shortly before the initiation of the cell change, it will typically be advantageous to keep as many uplink transmission resources as possible allocated to this base station until the user terminal has emptied the buffer of this data. This means that in the first step or few steps, single uplink resources could be replaced instead of replacing multiple resources in the first (few) step(s).

In a similar manner, the buffer level in the current serving base station can be of relevance for the cell change operation. For example, if the base station has much data in a transmit buffer and the data is destined to the user terminal, downlink resources could be replaced in multiple steps in a way that retains as many resources to this base station as possible until the data has been communicated to the user terminal. This means that single resources are typically replaced in the first few steps and then any remaining resources can be replaced in a single step.

The buffer level in the destination base station and/or in a control network node connected to the old and new base station can also be of relevance for performing the cell change procedure.

At least one of these replacement criteria is therefore preferably used when determining when and how the cell change is to be performed. This decision can be taken by the user terminal, one of the involved base stations or a control network node. In the latter case, the control node can notify the parties involved in the cell change of the provided replacement criterion or of how to perform the cell change.

It could be possible that there exists a default scheme defining how to perform the cell change. The cell change, i.e. how many multiple replacement steps, how many uplink resources to replace in each step, how many downlink resources to replace in each step, when to perform the replacement steps, etc., can be conducted according to this default scheme. If a divergence from this default scheme would be preferred, a control message is preferably generated, e.g. by a control node or the unit triggering the cell change, comprising information specifying how to perform the cell change. The provided replacement criterion is preferably used for generating such a control message.

In an alternative implementation, all units have access to different pre-defined cell change schemes and the particular scheme to utilize at a given cell change is determined based on at least one replacement criterion.

The technology described in this application, thus, provides several possibilities of adapting the cell change procedure to the current conditions and therefore provides a very flexible and versatile handover. The method then continues to step S3, where the radio resources are sequentially replaced according to a selected scheme or based on the provided replacement criterion.

Figure 11:
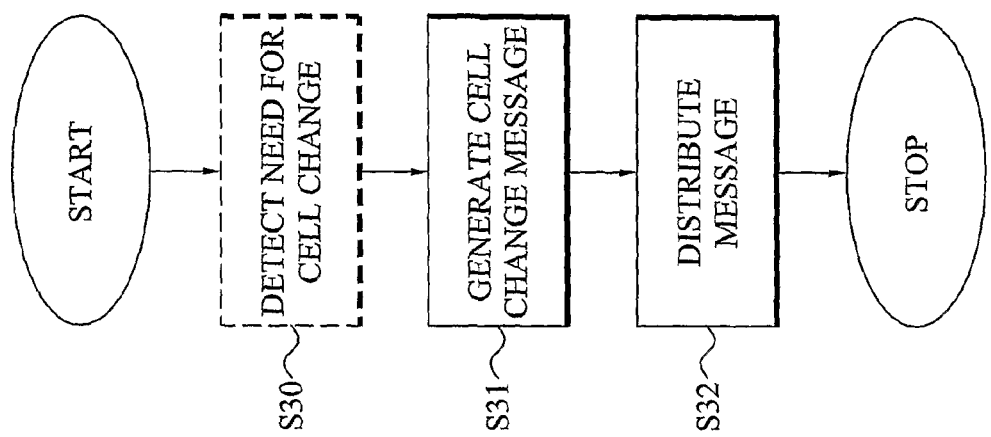
FIG. 11 is a flow diagram of a cell change control method according to a non-limiting, example embodiment.

FIG. 11 is a flow diagram of a cell change control method. This control method is applicable to a cellular radio communications system comprising a mobile user terminal present in a first cell and having multiple radio transmission resources simultaneously allocated for communication with a first base station associated with the first cell. In a first optional step S30, a need for a cell change is detected. This step basically corresponds to step S2 in FIG. 3 and is not further described. In a next step S31, a cell change control message is generated. This control message commands a sequential replacement of the multiple radio resources with radio transmission resources allocated to the mobile terminal for communication with at least one base station. This generated control message is distributed to the relevant parties, e.g. the user terminal, the first base station and the new serving base station(s). This control method can be performed by an application provided in the user terminal, in one of the communicating base stations or in a control network node, e.g. BSC or Radio Network Controller (RNC). The method then ends.

When the parties receive the control message, the cell change is performed by sequentially replacing the radio transmission resources, i.e. according to step S3 of FIG. 3.

As has been described in the foregoing text, the phased handover is typically preceded by signaling and information exchange between network nodes, such as base stations and control network nodes, and involved mobile user terminals. This data signaling involves data and results regarding quality measurements performed throughout the communication system and used in step S30 of FIG. 11 as a basis for deciding whether a phased handover should be initiated. Furthermore, signaling is typically present during a phased handover and is used for informing the relevant units of changes in the execution of the phased handover.

For example, once initiated the phased handover procedure can conceivably proceed in different ways. In a first embodiment, each "leg" of the phased handover involving a certain sub-set of the radio transmission resources allocated to a logical data flow could be evaluated and signaled individually. Uplink and downlink resources could be handled separately or together. Even though this requires extra signaling, maximum flexibility is offered since each leg could be performed at the most appropriate time for the ongoing service in the prevailing radio environment.

In an alternative embodiment, signaling would only take place when the phased handover procedure is initiated, then each leg would be performed in accordance with resource replacement criteria that are either communicated in the initial signaling phase or pre-defined according to a standard.

Thus, more or less extensive signaling can follow the initial distribution of the command message in step S32 of FIG. 11.

The technology described in this application can advantageously be applied with other techniques for improving a cell change or handover procedure. An example of such a technique that increases the robustness of handovers is described in PCT/SE2005/000365 and is denoted cell muting. Cell muting improves handover robustness by temporarily enhancing the radio environment of a user terminal engaged in handover signaling. This is achieved by muting one or more dominant interfering cells during part or all of the signaling process, either in all handover cases, or only when some specific conditions are fulfilled, for example a first handover command did not reach the user, or the user is deemed to be in sufficiently poor radio conditions according to some criteria.

As has been described in the foregoing text, a mobile user terminal regularly measures the received signal strength on frequencies used by neighboring base stations in accordance with a neighbor cell list that it receives from the network. During idle time slots, in the case of a GSM system, it also attempts to identify neighboring base stations by decoding their Base Station Identity Code (BSIC). A correctly decoded BSIC is required together with a received signal strength measurement in order for the measurement to be used in a handover decision. Once received by the network, the measurements are filtered and handover criteria are evaluated in a network node, typically the BSC. Such handover criteria may include a signal strength hysteresis value to minimize ping-pong handovers as well as other signal strength or timing penalties triggered by previous channel management operations.

The process of neighbor cell measurement, identification, reporting, filtering, and handover criteria evaluation is performed before any handover command can be sent. It is often carried out in an irregular cell plan with fast-moving users and an inhomogeneous radio environment. For these reasons, handover commands are often sent to mobile user terminals when they are already in the nominal coverage area of the target base station and moving further away from the serving base station all the time. With a tight reuse of radio resources, the handover process must clearly be executable in poor radio conditions in order to prevent dropping the call.

For example, the radio environment experienced by the mobile can be characterized by the carrier-to-interference ratio (C/I), which can be illustrated for the downlink with the carrier transmitted from the serving first base station in a first cell, and the interference arising from several surrounding base stations including the target base station in a second cell.

In accordance with the reasoning above, a handover command will often be sent to the mobile user terminal when it is already in the second cell. At this point, the base station in the second cell is likely to be the dominant source of downlink interference. In one embodiment of the cell muting, transmission on the appropriate frequency, or frequencies in the case of frequency hopping, and time slot from the base station in the second cell is simply muted at the time that the handover command is sent to the mobile user terminal from the first cell, thereby increasing the C/I and the likelihood that the handover command is received correctly. In an alternative embodiment, the appropriate transmission from several interfering base stations could be muted in this manner.

Since there is a cost involved in temporarily muting transmission, both in terms of lost bursts or frames for users in the muted cells, and in terms of control signaling in effecting the muting, a more attractive embodiment may be to only mute transmission if certain criteria are fulfilled. One possibility would be to consider the measurement reports for the radio link to the serving cell, for example reports of measures of received signal strength (e.g. RXLEV in GSM) and/or received quality (e.g. bit error rate represented by RXQUAL in GSM), and only apply the interference muting if the link quality to the serving base station is below some pre-defined threshold. Another possibility would be to only perform muting if an initial handover attempt fails. Subsequent attempts are likely to take place in even tougher radio conditions due to continued mobility away from the serving base station making muting an even more appealing option. Combinations of these and other criteria for triggering cell muting are of course possible. Utilising knowledge of mobile position and/or velocity would be one such alternative.

If this cell muting solution is applied as a complement to the other technology described in this application, more handovers could be successful earlier leading to reduced interference and fewer dropped calls. Moreover, since frames can be stolen each time handover signaling is transmitted in any case, e.g. in GSM, more robust handovers with cell muting are likely to decrease the total number of lost frames in such a network. In many cases with frequency hopping or similar techniques, a lost burst is manageable with channel coding anyway and there will be no negative quality impact at all.

Note also that cell muting makes the handover procedure more robust without spreading extra interference in the network.

Figure 12:
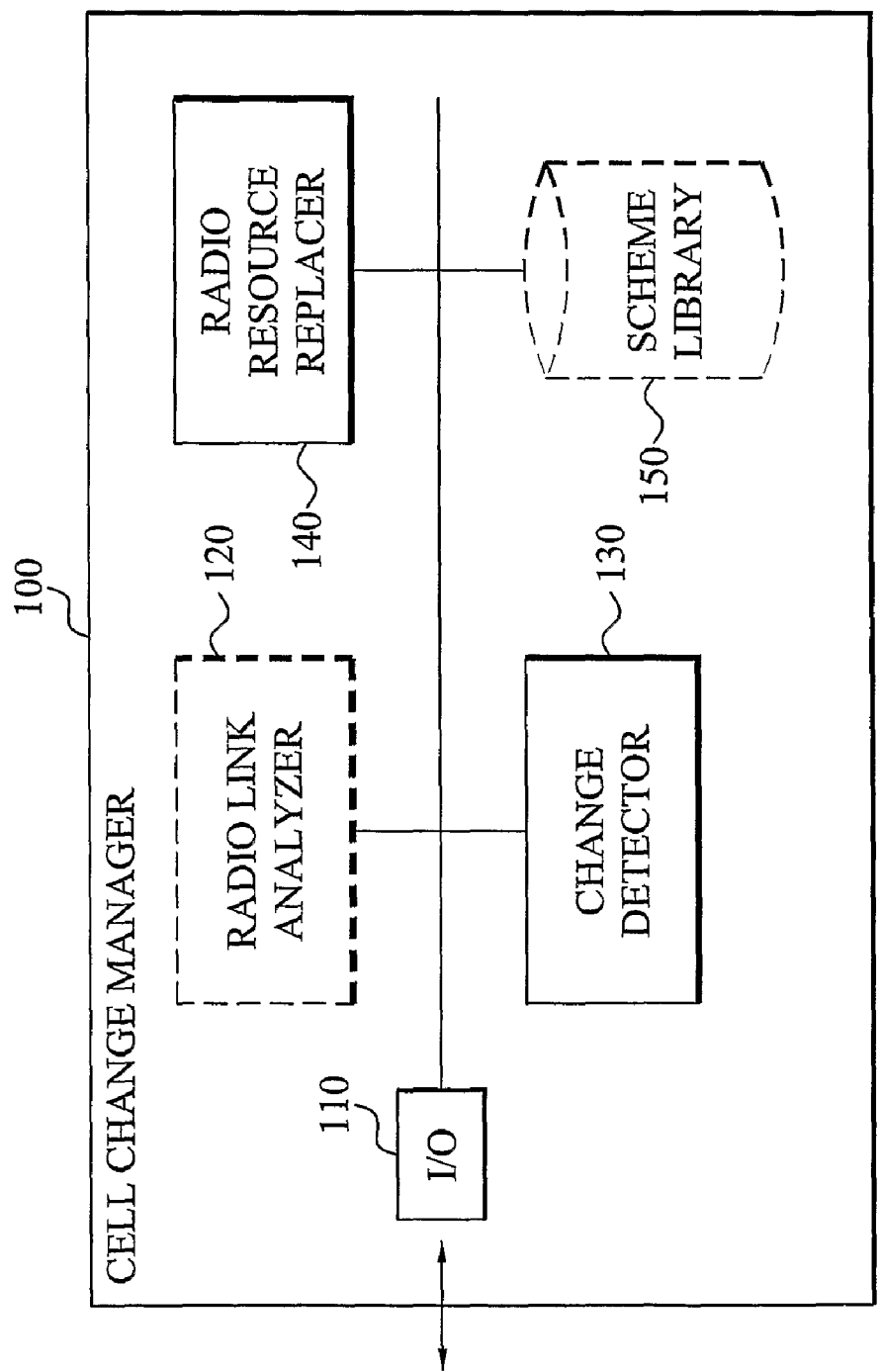
FIG. 12 is a schematic block diagram of a cell change manager according to a non-limiting, example embodiment.

FIG. 12 is a schematic block diagram of a cell change manager 100. This manager 100 generally comprises an input and output (I/O) unit 110 for conducting communication with external units. This I/O unit 110 can be arranged for receiving quality related measurement results that are utilized for determining whether to trigger a cell change. These measurements can be performed by different units involved in the cell change to come and other units in the communication system.

In an alternative embodiment, in particular when the cell change manager 100 is implemented in a communicating base station or mobile user terminal, a radio link analyzer 120 can be provided in the manager 100 for performing analysis of the current radio situation. In a particular embodiment, this analyzer 120 estimates, possibly using the I/O unit 110, received signal strength and generates a link quality metric or estimate based on the received signal strength. Other quality related parameters can also be analyzed and provided by this radio link analyzer 120.

A cell change detector 130 is arranged in the cell change manager 100 for detecting a need for a cell change involving a user terminal. This detector 130 preferably uses input information from the I/O unit 110 and/or the radio link analyzer 120 when performing this detection. This means that the detection is based on a radio quality parameter, e.g. received signal strength and/or estimated cell load. If a need for a cell change is detected, the detector 130 signals to a radio resource replacer 140 in the cell manager 100 commanding an initiation of a cell change.

The resource replacer 140 is arranged in the cell change manager 100 for sequentially replacing multiple communications resources simultaneously allocated to a mobile user terminal for communication with a first base station of a first cell with radio transmission resources allocated to the terminal for communication with at least one base station having an associated cell different from the first cell.

In an alternative embodiment, the resource replacer 140 is arranged for sequentially replacing at least a first and second radio transmission resource simultaneously allocated to a user terminal for conducting communication in a first and second cell, respectively. In addition, raw data transmitted on the at least first resource is different from the raw data transmitted on the at least second resource. The replacer 140 then sequentially replaces, i.e. in at least two steps, the at least first and second resource with radio transmission resources allocated to the user terminal for communication with at least one base station.

This means that the replacer 140 replaces the multiple communications resources in at least two steps. Note that the replacer 140 can replace multiple uplink resources, can replace multiple downlink resources or can replace multiple uplink and downlink resources. The new at least one serving cell involved in this cell change can be the same base station as the first (old) serving base station, in the case of intra-site handover, or one or more other base stations, in the case of so-called inter-site handover.

The resource replacer 140 can perform this sequential resource replacement according to a default replacement scheme, specifying at least one of i) how many steps the sequential replacement should contain, ii) how many resources should be replaced in the different steps, iii) which resources are to be replaced in the different steps, and iv) when are the steps to be performed. This default scheme is typically applicable and suitable for most cell change procedures and can be determined as an average scheme, e.g. based on information from multiple different cell changes previously performed by the cell manager 100, or be prescribed according to a standard. The cell change manager 100 can have a scheme memory 150 provided for storing information of this default scheme or pertinent information can be provided from an external unit.

In an alternative embodiment, the radio resource replacer 140 has access to multiple different pre-defined replacement schemes, e.g. provided in a scheme memory or library 150. The replacer 140 then selects a most appropriate replacement scheme to use for the current cell change procedure based on input information. This input information can include at least one of i) a value of a cell change related timer, ii) a quality parameter representative of the radio quality for a communications link between the user terminal and the old serving cell, iii) a quality parameter representative of the radio quality in a potential candidate destination cell, iv) a buffer level of a transmit buffer arranged in the user terminal, the old serving base station, a candidate for new serving base station or a control network node, or v) a series of one or more of the aforementioned quantities, i)-iv).

Information on which replacement scheme to utilize could also be received from an external node, e.g. a control network node.

The cell manager 100 can, of course, also operate without any available pre-defined replacement schemes and could then instead negotiate how the cell change should be performed with the other involved external parties or receive information on a suitable cell change procedure from a control network node.

The units 110 to 140 of the cell change manager 100 may be provided as software, hardware or a combination thereof. The units 110 to 150 may be implemented together in a user terminal, in a base station, in a control node or in another network node. Also a distributed implementation is possible with some of the units provided in different network nodes.

Figure 13:
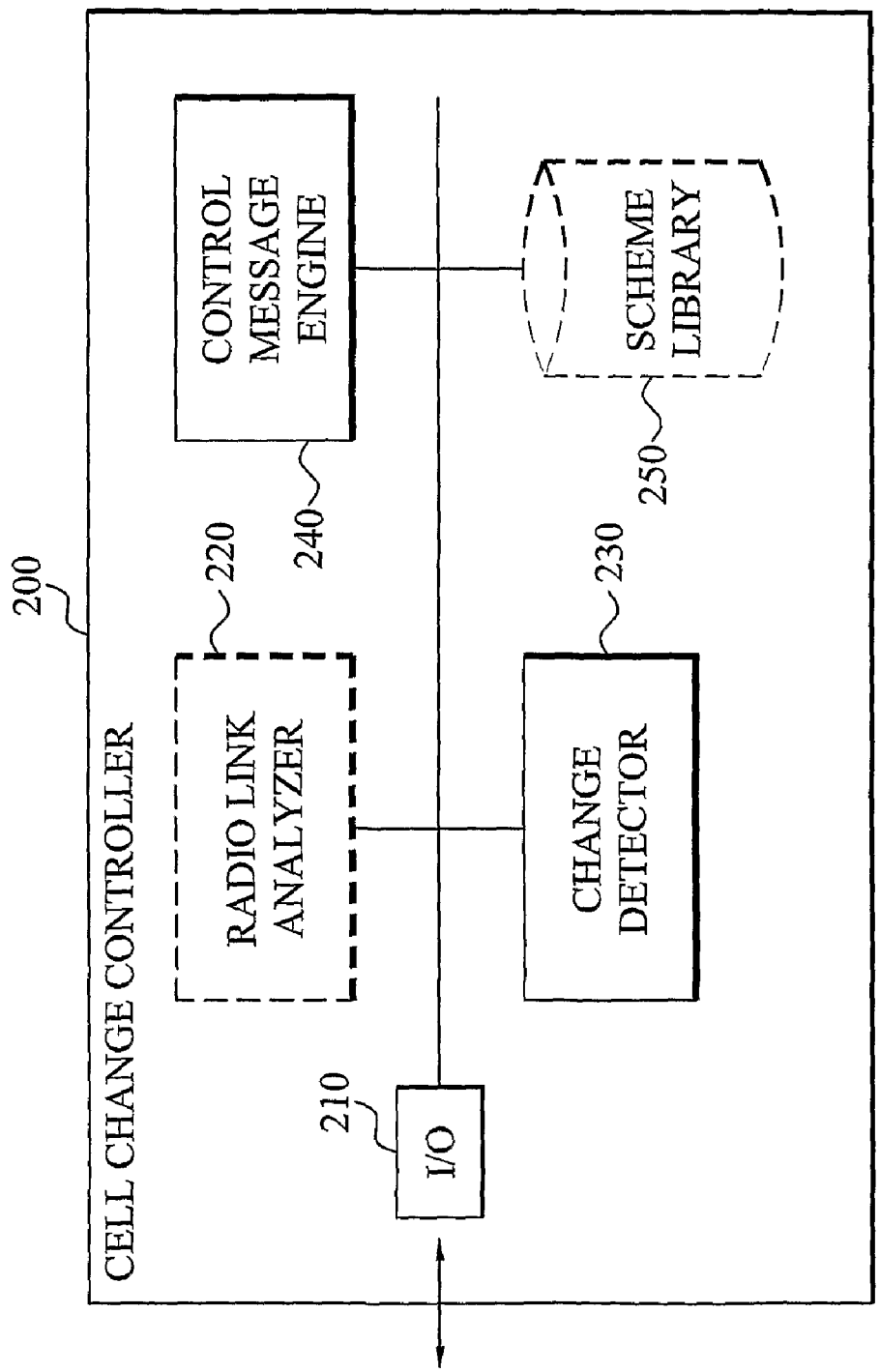
FIG. 13 is a schematic block diagram of a cell change controller according to a non-limiting, example embodiment.

FIG. 13 is a schematic block diagram of a cell change controller 200. This controller 200 generally comprises an I/O unit 210 for conducting communication with external units. This I/O unit 210 is in particular arranged for transmitting a control message commanding a sequential replacement of multiple radio transmission resources. This cell change controller 200 also comprises an optional radio link analyzer 220, a change detector 230 and an optional scheme library 250. The operation and function of these units 220, 230 and 250 are similar to the corresponding units in the cell change manager disclosed in FIG. 12 and described above.

The controller 200 also comprises a control message engine 240. This message engine 240 is preferably responsive to a cell change detection signal from the change detector 230 causing the message engine 240 to provide or generate a control message. This control message commands a destined receiver of the message to sequentially replace multiple radio transmission resources simultaneously allocated to a mobile user terminal for communication with a first base station of a first cell with radio transmission resources allocated to the terminal for communication with at least one base station having an associated cell different from the first cell.

In an alternative implementation, this control message commands a destined receiver of the message to sequentially replace multiple radio transmission resources simultaneously allocated to a mobile user terminal for communication in at least two different cells with radio transmission resources allocated to the terminal for communication with at least one base station.

The message engine 240 can use information of different pre-defined replacement schemes available from the scheme library 250 in the process of generating the control message.

The control message is then provided to the I/O unit 210 that forwards the message to the user terminal, the current serving base station, at least one potential new serving base station, and/or any other node involved in the cell change procedure.

The units 210 to 240 of the cell change controller 200 may be provided as hardware or a combination of hardware and software. The units 210 to 250 may be implemented together in a user terminal, in a base station, in a control node or in another network node. Also a distributed implementation is possible with some of the units provided in different network nodes.

It will be understood by a person skilled in the art that various modifications and changes may be made without departure from the scope of the appended claims.

The invention claimed is:

1. A cell change method in a cellular radio communications system comprising a mobile user terminal present in a first cell and having multiple radio transmission resources simultaneously allocated for communication with a first base station associated with the first cell, the method comprising:
sequentially replacing the multiple radio transmission resources with radio transmission resources allocated to the mobile user terminal for communication with at least one base station having an associated cell different from the first cell such that the multiple radio transmission resources are not replaced at the same time,
wherein the sequentially replacing is performed in at least two steps with a first amount of the multiple radio transmission resources being replaced in the first step and the remaining amount of the multiple radio transmission resources being replaced in one or more subsequent, time-separated steps.

2. A cell change method in a cellular radio communications system comprising a mobile user terminal simultaneously having at least a first radio transmission resource allocated for communication with a base station associated with a first cell and at least a second radio transmission resource allocated for communication with a base station associated with a second cell, the method comprising:
sequentially replacing the at least first radio transmission resource and second radio transmission resource with radio transmission resources allocated to the mobile user terminal for communication with at least one base station such that the multiple radio transmission resources are not replaced at the same time,
wherein the sequentially replacing is performed in at least two steps with a first amount of the multiple radio transmission resources being replaced in the first step and the remaining amount of the multiple radio transmission resources being replaced in one or more subsequent, time-separated steps, and
wherein raw data to be transmitted using the at least first radio transmission resource being different from raw data to be transmitted using the at least second radio transmission resource.

3. The method according to claim 1, wherein the sequentially replacing step comprises sequentially replacing the multiple radio transmission resources with radio transmission resources allocated to the mobile user terminal for communication with a second base station having an associated second cell.

4. The method according to claim 1, wherein the sequentially replacing step comprises sequentially replacing the multiple radio transmission resources with radio transmission resources allocated to the mobile user terminal for communication with the first base station when the mobile user terminal is present in a second cell associated with the first base station.

5. The method according to claim 1, wherein the sequentially replacing step comprises sequentially replacing the multiple radio transmission resources with radio transmission resources allocated to the mobile user terminal for communication with multiple base stations, where each of the multiple base stations has an associated respective cell and at least one cell of the respective cells is different from the first cell.

6. The method according to claim 1, the method comprising detecting a need for cell change based on at least one of an estimated radio quality metric and an estimated cell load metric, and the sequentially replacing step is performed in response to the detection.

7. The method according to claim 1, wherein the mobile user terminal has N radio transmission resources simultaneously allocated for communication with the first base station, where N is an integer equal to or larger than two, and the sequentially replacing step comprises the steps of:
replacing M radio transmission resources of the N radio transmission resources with M radio transmission resources allocated to the mobile user terminal for communication with the at least one base station, where $1 \leq M < N$;
communicating data on the M radio transmission resources and communicating data on N-M remaining radio transmission resources; and
replacing the N-M remaining radio transmission resources with N-M radio transmission resources allocated to the mobile user terminal for communication with the at least one base station.

8. The method according to claim 7, wherein data communicated between the mobile user terminal and the at least one base station using the M radio transmission resources and data communicated between the mobile user terminal and the first base station using the N-M radio transmission resources being related on a physical, data link, network, transport, session, presentation or application layer.

9. The method according to claim 7, wherein data communicated between the mobile user terminal and the at least one base station using the M radio transmission resources and data communicated between the mobile user terminal and the first base station using the N-M radio transmission resources being based on common information.

10. The method according to claim 7, wherein user plane data communicated between the mobile user terminal and the at least one base station using the M radio transmission resources is not related to user plane data communicated between the mobile user terminal and the first base station using the N-M radio transmission resources.

11. The method according to claim 7, wherein control data communicated between the mobile user terminal and the at least one base station using the M radio transmission resources is related to control data communicated between the mobile user terminal and the first base station using the N-M radio transmission resources.

12. A cell change control method in a cellular radio communications system comprising a mobile user terminal present in a first cell and having multiple radio transmission resources simultaneously allocated for communication with a first base station associated with the first cell, the method comprising:
generating a cell change control message commanding a sequential replacement of the multiple radio transmission resources with radio transmission resources allocated to the mobile user terminal for communication with at least one base station having an associated cell different from the first cell such that the multiple radio transmission resources are not replaced at the same time,
wherein the sequential replacement is to be performed in at least two steps with a first amount of the multiple radio transmission resources being replaced in the first step and the remaining amount of the multiple radio transmission resources being replaced in one or more subsequent, time-separated steps.

13. A cell change control method in a cellular radio communications system comprising a mobile user terminal simultaneously having at least a first radio transmission resource allocated for communication with a base station associated with a first cell and at least a second radio transmission resource allocated for communication with a base station associated with a second cell, the method comprising:
generating a cell change control message commanding a sequential replacement of the at least first radio transmission resource and of the at least second radio transmission resource with radio transmission resources allocated to the mobile user terminal for communication with at least one base station such that the multiple radio transmission resources are not replaced at the same time,
wherein the sequential replacement is to be performed in at least two steps with a first amount of the multiple radio transmission resources being replaced in the first step and the remaining amount of the multiple radio transmission resources being replaced in one or more subsequent, time-separated steps,
wherein raw data to be transmitted using the at least first radio transmission resource being different from raw data to be transmitted using the at least second radio transmission resource.

14. A cell change manager comprising hardware configured to sequentially replace multiple radio transmission resources simultaneously allocated to a mobile user terminal for communication with a first base station of a first cell with radio transmission resources allocated to the mobile user terminal for communication with at least one base station having an associated cell different from the first cell such that the multiple radio transmission resources are not replaced at the same time,
wherein the sequentially replacing is performed in at least two steps with a first amount of the multiple radio transmission resources being replaced in the first step and the remaining amount of the multiple radio transmission resources being replaced in one or more subsequent, time-separated steps.

15. A cell change manager comprising hardware configured to sequentially replace at least a first radio transmission resource allocated to a mobile user terminal for communication with a base station of a first cell and at least a second radio transmission resource simultaneously allocated to the mobile user terminal for communication with a base station of a second cell with radio transmission resources allocated to the mobile user terminal for communication with at least one base station such that the multiple radio transmission resources are not replaced at the same time,
wherein the sequential replacement is configured to be performed in at least two steps with a first amount of the multiple radio transmission resources being replaced in the first step and the remaining amount of the multiple radio transmission resources being replaced in one or more subsequent, time-separated steps, and wherein raw data to be transmitted using the at least first radio transmission resource being different from raw data to be transmitted using the at least second radio transmission resource.

16. The manager according to claim 14, wherein the hardware is configured for sequentially replacing the multiple radio transmission resources with radio transmission resources allocated to the mobile user terminal for communication with a second base station having an associated second cell.

17. The manager according to claim 14, wherein the hardware is configured for sequentially replacing the multiple radio transmission resources with radio transmission resources allocated to the mobile user terminal for communication with the first base station when the mobile user terminal is present in a second cell associated with the first base station.

18. The manager according to claim 14, wherein hardware is configured for sequentially replacing the multiple radio transmission resources with radio transmission resources allocated to the mobile user terminal for communication with multiple base stations, where each of the multiple base stations has an associated respective cell and at least one cell of the respective cells is different from the first cell.

19. The manager according to claim 14, further comprising a detector for detecting a need for cell change based on at least one of an estimated radio quality metric and an estimated cell load metric, and for generating a detection signal based on the detection, and the hardware being configured for performing the sequential replacement of the multiple radio transmission resources in response to the detection signal.

20. A network node comprising a cell change manager according to claim 14.

21. A mobile user terminal comprising a cell change manager according to claim 14.

22. A cell change controller comprising:
hardware configured to generate a cell change control message commanding a sequential replacement of multiple radio transmission resources simultaneously allocated to a mobile user terminal for communication with a first base station of a first cell with radio transmission resources allocated to the mobile user terminal for communication with at least one base station having an associated cell different from the first cell such that the multiple radio transmission resources are not replaced at the same time, wherein the sequential replacement is to be performed in at least two steps with a first amount of the multiple radio transmission resources being replaced in the first step and the remaining amount of the multiple radio transmission resources being replaced in one or more subsequent, time-separated steps; and a transmitter for transmitting the cell change control message to at least one of the mobile user terminal, the first base station and the at least one base station.

23. A cell change controller comprising:
means for generating a cell change control message commanding a sequential replacement of at least a first radio transmission resource allocated to a mobile user terminal for communication with a base station of a first cell and of at least a second radio transmission resource simultaneously allocated to the mobile user terminal for communication with a base station of a second cell with radio transmission resources allocated to the mobile user terminal for communication with at least one base station such that the multiple radio transmission resources are not replaced at the same time, wherein the sequential replacement is to be performed in at least two steps with a first amount of the multiple radio transmission resources being replaced in the first step and the remaining amount of the multiple radio transmission resources being replaced in one or more subsequent, time-separated steps, wherein raw data to be transmitted using the at least first radio transmission resource being different from raw data to be transmitted using the at least second radio transmission resource; and a transmitter for transmitting the cell change control message to at least one of the mobile user terminal, the base station and the at least one base station.

24. A network node comprising a cell change controller according to claim 22.

25. A mobile user terminal comprising a cell change controller according to claim 22.

26. cell change control method according to claim 12, wherein the mobile user terminal has N radio transmission resources simultaneously allocated for communication with the first base station, where N is an integer equal to or larger than two, and the sequential replacement comprises:
replacing M radio transmission resources of the N radio transmission resources with M radio transmission resources allocated to the mobile user terminal for communication with the at least one base station, where $1 \leq M < N$;

communicating data on the M radio transmission resources and communicating data on N-M remaining radio transmission resources; and replacing the N-M remaining radio transmission resources with N-M radio transmission resources allocated to the mobile user terminal for communication with the at least one base station, wherein user plane data communicated between the mobile user terminal and the at least one base station using the M radio transmission resources is not related to user plane data communicated between the mobile user terminal and the first base station using the N-M radio transmission resources.

27. The method according to claim 26, wherein control data communicated between the mobile user terminal and the at least one base station using the M radio transmission resources is related to control data communicated between the mobile user terminal and the first base station using the N-M radio transmission resources.

28. The manager according to claim 14, wherein the mobile user terminal has N radio transmission resources simultaneously allocated for communication with the first base station, where N is an integer equal to or larger than two, and the hardware is configured to:
replace M radio transmission resources of the N radio transmission resources with M radio transmission resources allocated to the mobile user terminal for communication with the at least one base station, where $1 \leq M < N$;

communicate data on the M radio transmission resources and communicating data on N-M remaining radio transmission resources; and replace the N-M remaining radio transmission resources with N-M radio transmission resources allocated to the mobile user terminal for communication with the at least one base station, wherein user plane data communicated between the mobile user terminal and the at least one base station using the M radio transmission resources is not related to user plane data communicated between the mobile user terminal and the first base station using the N-M radio transmission resources.

29. The manage according to claim 28, wherein control data communicated between the mobile user terminal and the at least one base station using the M radio transmission resources is related to control data communicated between the mobile user terminal and the first base station using the N-M radio transmission resources.

30. The cell change controller according to claim 22, wherein the mobile user terminal has N radio transmission resources simultaneously allocated for communication with the first base station, where N is an integer equal to or larger than two, and the sequential replacement includes:
  replacing M radio transmission resources of the N radio transmission resources with M radio transmission resources allocated to the mobile user terminal for communication with the at least one base station, where $1 \leq M < N$;
  communicating data on the M radio transmission resources and communicating data on N-M remaining radio transmission resources; and
  replacing the N-M remaining radio transmission resources with N-M radio transmission resources allocated to the mobile user terminal for communication with the at least one base station,
  wherein user plane data communicated between the mobile user terminal and the at least one base station using the M radio transmission resources is not related to user plane data communicated between the mobile user terminal and the first base station using the N-M radio transmission resources.

31. The cell change controller according to claim 30, wherein control data communicated between the mobile user terminal and the at least one base station using the M radio transmission resources is related to control data communicated between the mobile user terminal and the first base station using the N-M radio transmission resources.

* * * * *

UNITED STATES PATENT AND TRADEMARK OFFICE
CERTIFICATE OF CORRECTION

PATENT NO. : 8,031,673 B2
APPLICATION NO. : 11/921179
DATED : October 4, 2011
INVENTOR(S) : Craig et al.

Page 1 of 1

It is certified that error appears in the above-identified patent and that said Letters Patent is hereby corrected as shown below:

In Column 23, Line 15, in Claim 6, delete "the" and insert -- wherein the --, therefor.

In Column 26, Line 20, in Claim 26, delete "cell" and insert -- The cell --, therefor.

In Column 27, Line 5, in Claim 29, delete "manage" and insert -- manager --, therefor.

Signed and Sealed this
Fourteenth Day of February, 2012

David J. Kappos
*Director of the United States Patent and Trademark Office*